United States Patent
Musk et al.

(10) Patent No.: US 11,567,514 B2
(45) Date of Patent: Jan. 31, 2023

(54) AUTONOMOUS AND USER CONTROLLED VEHICLE SUMMON TO A TARGET

(71) Applicant: Tesla, Inc., Austin, CA (US)

(72) Inventors: Elon Musk, Los Angeles, CA (US); Kate Park, Los Altos, CA (US); Nenad Uzunovic, San Carlos, CA (US); Christopher Coleman Moore, San Francisco, CA (US); Francis Havlak, Half Moon Bay, CA (US); Stuart Bowers, Palo Alto, CA (US); Andrej Karpathy, San Francisco, CA (US); Arvind Ramanandan, Sunnyvale, CA (US); Ashima Kapur Sud, San Jose, CA (US); Paul Chen, Woodside, CA (US); Paril Jain, Mountain View, CA (US); Alexander Hertzberg, Berkeley, CA (US); Jason Kong, San Francisco, CA (US); Li Wang, Cupertino, CA (US); Oktay Arslan, Fremont, CA (US); Nicklas Gustafsson, Menlo Park, CA (US); Charles Shieh, Cupertino, CA (US); David Seelig, Stanford, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 16/272,273

(22) Filed: Feb. 11, 2019

(65) Prior Publication Data
US 2020/0257317 A1     Aug. 13, 2020

(51) Int. Cl.
*G05D 1/02*     (2020.01)
*G05D 1/12*     (2006.01)
(Continued)

(52) U.S. Cl.
CPC ............ *G05D 1/12* (2013.01); *G05D 1/0033* (2013.01); *G05D 1/0088* (2013.01);
(Continued)

(58) Field of Classification Search
CPC .. G05D 1/0033; G05D 1/0088; G05D 1/0221; G05D 1/12; G05D 2201/0213;
(Continued)

(56) References Cited

U.S. PATENT DOCUMENTS 6,882,755 B2   5/2005   Silverstein et al.
7,209,031 B2   4/2007   Nakai et al.
(Continued)

FOREIGN PATENT DOCUMENTS

AU     2019261735 A1     6/2020
AU     2019201716 A1     10/2020
(Continued)

OTHER PUBLICATIONS

International Search Report and Written Opinion dated Aug. 4, 2020 in PCT/US2020/17316.

*Primary Examiner* — Frederick M Brushaber
*Assistant Examiner* — Matthew J. Reda
(74) *Attorney, Agent, or Firm* — Knobbe, Martens, Olson & Bear, LLP

(57) ABSTRACT

A processor coupled to memory is configured to receive an identification of a geographical location associated with a target specified by a user remote from a vehicle. A machine learning model is utilized to generate a representation of at least a portion of an environment surrounding the vehicle using sensor data from one or more sensors of the vehicle. At least a portion of a path to a target location corresponding to the received geographical location is calculated using the generated representation of the at least portion of the environment surrounding the vehicle. At least one command is
(Continued)

provided to automatically navigate the vehicle based on the determined path and updated sensor data from at least a portion of the one or more sensors of the vehicle.

25 Claims, 9 Drawing Sheets

(51) Int. Cl.
  *G06N 20/00* (2019.01)
  *G05D 1/00* (2006.01)
  *G06N 3/08* (2006.01)

(52) U.S. Cl.
  CPC ............. *G05D 1/0221* (2013.01); *G06N 3/08* (2013.01); *G06N 20/00* (2019.01); *G05D 2201/0213* (2013.01)

(58) Field of Classification Search
  CPC ........ G05D 1/0044; G06N 20/00; G06N 3/08; B60W 30/00; B62D 15/0285; G01C 21/005; G01C 21/206; G01C 21/3407; G08G 1/14
  See application file for complete search history.

(56) References Cited

U.S. PATENT DOCUMENTS

| | | |
|---|---|---|
| 7,747,070 B2 | 6/2010 | Puri |
| 7,904,867 B2 | 3/2011 | Burch et al. |
| 7,974,492 B2 | 7/2011 | Nishijima |
| 8,165,380 B2 | 4/2012 | Choi et al. |
| 8,369,633 B2 | 2/2013 | Lu et al. |
| 8,406,515 B2 | 3/2013 | Cheatle et al. |
| 8,509,478 B2 | 8/2013 | Haas et al. |
| 8,588,470 B2 | 11/2013 | Rodriguez et al. |
| 8,744,174 B2 | 6/2014 | Hamada et al. |
| 8,773,498 B2 | 7/2014 | Lindbergh |
| 8,912,476 B2 | 12/2014 | Fogg et al. |
| 8,913,830 B2 | 12/2014 | Sun et al. |
| 8,928,753 B2 | 1/2015 | Han et al. |
| 8,972,095 B2 | 3/2015 | Furuno et al. |
| 8,976,269 B2 | 3/2015 | Duong |
| 9,008,422 B2 | 4/2015 | Eid et al. |
| 9,081,385 B1 | 7/2015 | Ferguson et al. |
| 9,275,289 B2 | 3/2016 | Li et al. |
| 9,586,455 B2 | 3/2017 | Sugai et al. |
| 9,672,437 B2 | 6/2017 | McCarthy |
| 9,710,696 B2 | 7/2017 | Wang et al. |
| 9,738,223 B2 | 8/2017 | Zhang et al. |
| 9,754,154 B2 | 9/2017 | Craig et al. |
| 9,767,369 B2 | 9/2017 | Furman et al. |
| 9,965,865 B1 | 5/2018 | Agrawal et al. |
| 10,133,273 B2 | 11/2018 | Linke |
| 10,140,252 B2 | 11/2018 | Fowers et al. |
| 10,140,544 B1 | 11/2018 | Zhao et al. |
| 10,146,225 B2 | 12/2018 | Ryan |
| 10,152,655 B2 | 12/2018 | Krishnamurthy et al. |
| 10,167,800 B1 | 1/2019 | Chung et al. |
| 10,169,680 B1 | 1/2019 | Sachdeva et al. |
| 10,192,016 B2 | 1/2019 | Ng et al. |
| 10,216,189 B1 | 2/2019 | Haynes |
| 10,228,693 B2 | 3/2019 | Micks et al. |
| 10,242,293 B2 | 3/2019 | Shim et al. |
| 10,248,121 B2 | 4/2019 | VandenBerg, III |
| 10,262,218 B2 | 4/2019 | Lee et al. |
| 10,282,623 B1 | 5/2019 | Ziyaee et al. |
| 10,296,828 B2 | 5/2019 | Viswanathan |
| 10,303,961 B1 | 5/2019 | Stoffel et al. |
| 10,310,087 B2 | 6/2019 | Laddha et al. |
| 10,311,312 B2 | 6/2019 | Yu et al. |
| 10,318,848 B2 | 6/2019 | Dijkman et al. |
| 10,325,178 B1 | 6/2019 | Tang et al. |
| 10,331,974 B2 | 6/2019 | Zia et al. |
| 10,338,600 B2 | 7/2019 | Yoon et al. |
| 10,343,607 B2 | 7/2019 | Kumon et al. |
| 10,359,783 B2 | 7/2019 | Williams et al. |
| 10,366,290 B2 | 7/2019 | Wang et al. |
| 10,372,130 B1 | 8/2019 | Kaushansky et al. |
| 10,373,019 B2 | 8/2019 | Nariyambut Murali et al. |
| 10,373,026 B1 | 8/2019 | Kim et al. |
| 10,380,741 B2 | 8/2019 | Yedla et al. |
| 10,394,237 B2 | 8/2019 | Xu et al. |
| 10,395,144 B2 | 8/2019 | Zeng et al. |
| 10,402,646 B2 | 9/2019 | Klaus |
| 10,402,986 B2 | 9/2019 | Ray et al. |
| 10,414,395 B1 | 9/2019 | Sapp et al. |
| 10,423,934 B1 | 9/2019 | Zanghi et al. |
| 10,436,615 B2 | 10/2019 | Agarwal et al. |
| 10,452,905 B2 | 10/2019 | Segalovitz et al. |
| 10,460,053 B2 | 10/2019 | Olson et al. |
| 10,467,459 B2 | 11/2019 | Chen et al. |
| 10,468,008 B2 | 11/2019 | Beckman et al. |
| 10,468,062 B1 | 11/2019 | Levinson et al. |
| 10,470,510 B1 | 11/2019 | Koh et al. |
| 10,474,160 B2 | 11/2019 | Huang et al. |
| 10,474,161 B2 | 11/2019 | Huang et al. |
| 10,474,928 B2 | 11/2019 | Sivakumar et al. |
| 10,489,126 B2 | 11/2019 | Kumar et al. |
| 10,489,972 B2 | 11/2019 | Atsmon |
| 10,503,971 B1 | 12/2019 | Dang et al. |
| 10,514,711 B2 | 12/2019 | Bar-Nahum et al. |
| 10,528,824 B2 | 1/2020 | Zou |
| 10,529,078 B2 | 1/2020 | Abreu et al. |
| 10,529,088 B2 | 1/2020 | Fine et al. |
| 10,534,854 B2 | 1/2020 | Sharma et al. |
| 10,535,191 B2 | 1/2020 | Sachdeva et al. |
| 10,542,930 B1 | 1/2020 | Sanchez et al. |
| 10,546,197 B2 | 1/2020 | Shrestha et al. |
| 10,546,217 B2 | 1/2020 | Albright et al. |
| 10,552,682 B2 | 2/2020 | Jonsson et al. |
| 10,559,386 B1 | 2/2020 | Neuman |
| 10,565,475 B2 | 2/2020 | Lecue et al. |
| 10,567,674 B2 | 2/2020 | Kirsch |
| 10,568,570 B1 | 2/2020 | Sherpa et al. |
| 10,572,717 B1 | 2/2020 | Zhu et al. |
| 10,574,905 B2 | 2/2020 | Srikanth et al. |
| 10,579,058 B2 | 3/2020 | Oh et al. |
| 10,579,063 B2 | 3/2020 | Haynes et al. |
| 10,579,897 B2 | 3/2020 | Redmon et al. |
| 10,586,280 B2 | 3/2020 | McKenna et al. |
| 10,591,914 B2 | 3/2020 | Palanisamy et al. |
| 10,592,785 B2 | 3/2020 | Zhu et al. |
| 10,599,701 B2 | 3/2020 | Liu |
| 10,599,930 B2 | 3/2020 | Lee et al. |
| 10,599,958 B2 | 3/2020 | He et al. |
| 10,606,990 B2 | 3/2020 | Tuli et al. |
| 10,609,434 B2 | 3/2020 | Singhai et al. |
| 10,614,344 B2 | 4/2020 | Anthony et al. |
| 10,621,513 B2 | 4/2020 | Deshpande et al. |
| 10,627,818 B2 | 4/2020 | Sapp et al. |
| 10,628,432 B2 | 4/2020 | Guo et al. |
| 10,628,686 B2 | 4/2020 | Ogale et al. |
| 10,628,688 B1 | 4/2020 | Kim et al. |
| 10,629,080 B2 | 4/2020 | Kazemi et al. |
| 10,636,161 B2 | 4/2020 | Uchigaito |
| 10,636,169 B2 | 4/2020 | Estrada et al. |
| 10,642,275 B2 | 5/2020 | Silva et al. |
| 10,645,344 B2 | 5/2020 | Marman et al. |
| 10,649,464 B2 | 5/2020 | Gray |
| 10,650,071 B2 | 5/2020 | Asgekar et al. |
| 10,652,565 B1 | 5/2020 | Zhang et al. |
| 10,656,657 B2 | 5/2020 | Djuric et al. |
| 10,657,391 B2 | 5/2020 | Chen et al. |
| 10,657,418 B2 | 5/2020 | Marder et al. |
| 10,657,934 B1 | 5/2020 | Kolen et al. |
| 10,661,902 B1 | 5/2020 | Tavshikar |
| 10,664,750 B2 | 5/2020 | Greene |
| 10,671,082 B2 | 6/2020 | Huang et al. |
| 10,671,886 B2 | 6/2020 | Price et al. |
| 10,678,244 B2 | 6/2020 | Iandola et al. |
| 10,678,839 B2 | 6/2020 | Gordon et al. |
| 10,678,997 B2 | 6/2020 | Ahuja et al. |
| 10,679,129 B2 | 6/2020 | Baker |

(56) References Cited

U.S. PATENT DOCUMENTS

| | | | |
|---|---|---|---|
| 10,685,159 B2 | 6/2020 | Su et al. |
| 10,685,188 B1 | 6/2020 | Zhang et al. |
| 10,692,000 B2 | 6/2020 | Surazhsky et al. |
| 10,692,242 B1 | 6/2020 | Morrison et al. |
| 10,693,740 B2 | 6/2020 | Coccia et al. |
| 10,698,868 B2 | 6/2020 | Guggilla et al. |
| 10,699,119 B2 | 6/2020 | Lo et al. |
| 10,699,140 B2 | 6/2020 | Kench et al. |
| 10,699,477 B2 | 6/2020 | Levinson et al. |
| 10,713,502 B2 | 7/2020 | Tiziani |
| 10,719,759 B2 | 7/2020 | Kutliroff |
| 10,725,475 B2 | 7/2020 | Yang et al. |
| 10,726,264 B2 | 7/2020 | Sawhney et al. |
| 10,726,279 B1 | 7/2020 | Kim et al. |
| 10,726,374 B1 | 7/2020 | Engineer et al. |
| 10,732,261 B1 | 8/2020 | Wang et al. |
| 10,733,262 B2 | 8/2020 | Miller et al. |
| 10,733,482 B1 | 8/2020 | Lee et al. |
| 10,733,638 B1 | 8/2020 | Jain et al. |
| 10,733,755 B2 | 8/2020 | Liao et al. |
| 10,733,876 B2 | 8/2020 | Moura et al. |
| 10,740,563 B2 | 8/2020 | Dugan |
| 10,740,914 B2 | 8/2020 | Xiao et al. |
| 10,748,062 B2 | 8/2020 | Rippel et al. |
| 10,748,247 B2 | 8/2020 | Paluri |
| 10,751,879 B2 | 8/2020 | Li et al. |
| 10,755,112 B2 | 8/2020 | Mabuchi |
| 10,755,575 B2 | 8/2020 | Johnston et al. |
| 10,757,330 B2 | 8/2020 | Ashrafi |
| 10,762,396 B2 | 9/2020 | Vallespi et al. |
| 10,768,628 B2 | 9/2020 | Martin et al. |
| 10,768,629 B2 | 9/2020 | Song et al. |
| 10,769,446 B2 | 9/2020 | Chang et al. |
| 10,769,483 B2 | 9/2020 | Nirenberg et al. |
| 10,769,493 B2 | 9/2020 | Yu et al. |
| 10,769,494 B2 | 9/2020 | Xiao et al. |
| 10,769,525 B2 | 9/2020 | Redding et al. |
| 10,776,626 B1 | 9/2020 | Lin et al. |
| 10,776,673 B2 | 9/2020 | Kim et al. |
| 10,776,939 B2 | 9/2020 | Ma et al. |
| 10,779,760 B2 | 9/2020 | Lee et al. |
| 10,783,381 B2 | 9/2020 | Yu et al. |
| 10,783,454 B2 | 9/2020 | Shoaib et al. |
| 10,789,402 B1 | 9/2020 | Vemuri et al. |
| 10,789,544 B2 | 9/2020 | Fiedel et al. |
| 10,790,919 B1 | 9/2020 | Kolen et al. |
| 10,796,221 B2 | 10/2020 | Zhang et al. |
| 10,796,355 B1 | 10/2020 | Price et al. |
| 10,796,423 B2 | 10/2020 | Goja |
| 10,798,368 B2 | 10/2020 | Briggs et al. |
| 10,803,325 B2 | 10/2020 | Bai et al. |
| 10,803,328 B1 | 10/2020 | Bai et al. |
| 10,803,743 B2 | 10/2020 | Abari et al. |
| 10,805,629 B2 | 10/2020 | Liu et al. |
| 10,809,730 B2 | 10/2020 | Chintakindi |
| 10,810,445 B1 | 10/2020 | Kangaspunta |
| 10,816,346 B2 | 10/2020 | Wheeler et al. |
| 10,816,992 B2 | 10/2020 | Chen |
| 10,817,731 B2 | 10/2020 | Vallespi et al. |
| 10,817,732 B2 | 10/2020 | Porter et al. |
| 10,819,923 B1 | 10/2020 | McCauley et al. |
| 10,824,122 B2 | 11/2020 | Mummadi et al. |
| 10,824,862 B2 | 11/2020 | Qi et al. |
| 10,828,790 B2 | 11/2020 | Nemallan |
| 10,832,057 B2 | 11/2020 | Chan et al. |
| 10,832,093 B1 | 11/2020 | Taralova et al. |
| 10,832,414 B2 | 11/2020 | Pfeiffer |
| 10,832,418 B2 | 11/2020 | Karasev et al. |
| 10,833,785 B1 | 11/2020 | O'Shea et al. |
| 10,836,379 B2 | 11/2020 | Xiao et al. |
| 10,838,936 B2 | 11/2020 | Cohen |
| 10,839,230 B2 | 11/2020 | Charette et al. |
| 10,839,578 B2 | 11/2020 | Coppersmith et al. |
| 10,843,628 B2 | 11/2020 | Kawamoto et al. |
| 10,845,820 B2 | 11/2020 | Wheeler |
| 10,845,943 B1 | 11/2020 | Ansari et al. |
| 10,846,831 B2 | 11/2020 | Raduta |
| 10,846,888 B2 | 11/2020 | Kaplanyan et al. |
| 10,853,670 B2 | 12/2020 | Sholingar et al. |
| 10,853,739 B2 | 12/2020 | Truong et al. |
| 10,860,919 B2 | 12/2020 | Kanazawa et al. |
| 10,860,924 B2 | 12/2020 | Burger |
| 10,867,444 B2 | 12/2020 | Russell et al. |
| 10,871,444 B2 | 12/2020 | Al et al. |
| 10,871,782 B2 | 12/2020 | Milstein et al. |
| 10,872,204 B2 | 12/2020 | Zhu et al. |
| 10,872,254 B2 | 12/2020 | Mangla et al. |
| 10,872,326 B2 | 12/2020 | Garner |
| 10,872,531 B2 | 12/2020 | Liu et al. |
| 10,885,083 B2 | 1/2021 | Moeller-Bertram et al. |
| 10,887,433 B2 | 1/2021 | Fu et al. |
| 10,890,898 B2 | 1/2021 | Akella et al. |
| 10,891,715 B2 | 1/2021 | Li |
| 10,891,735 B2 | 1/2021 | Yang et al. |
| 10,893,070 B2 | 1/2021 | Wang et al. |
| 10,893,107 B1 | 1/2021 | Callari et al. |
| 10,896,763 B2 | 1/2021 | Kempanna et al. |
| 10,901,416 B2 | 1/2021 | Khanna et al. |
| 10,901,431 B1 * | 1/2021 | Ebrahimi Afrouzi ...... G06T 7/73 |
| 10,901,508 B2 | 1/2021 | Laszlo et al. |
| 10,902,551 B1 | 1/2021 | Mellado et al. |
| 10,908,068 B2 | 2/2021 | Amer et al. |
| 10,908,606 B2 | 2/2021 | Stein et al. |
| 10,909,368 B2 | 2/2021 | Guo et al. |
| 10,909,453 B2 | 2/2021 | Myers et al. |
| 10,915,783 B1 | 2/2021 | Hallman et al. |
| 10,917,522 B2 | 2/2021 | Segalis et al. |
| 10,921,817 B1 | 2/2021 | Kangaspunta |
| 10,922,578 B2 | 2/2021 | Banerjee et al. |
| 10,924,661 B2 | 2/2021 | Vasconcelos et al. |
| 10,928,508 B2 | 2/2021 | Swaminathan |
| 10,929,757 B2 | 2/2021 | Baker et al. |
| 10,930,065 B2 | 2/2021 | Grant et al. |
| 10,936,908 B1 | 3/2021 | Ho et al. |
| 10,937,186 B2 | 3/2021 | Wang et al. |
| 10,943,101 B2 | 3/2021 | Agarwal et al. |
| 10,943,132 B2 | 3/2021 | Wang et al. |
| 10,943,355 B2 | 3/2021 | Fagg et al. |
| 2003/0035481 A1 | 2/2003 | Hahm |
| 2005/0162445 A1 | 7/2005 | Sheasby et al. |
| 2006/0072847 A1 | 4/2006 | Chor et al. |
| 2006/0224533 A1 | 10/2006 | Thaler |
| 2006/0280364 A1 | 12/2006 | Ma et al. |
| 2009/0016571 A1 | 1/2009 | Tijerina et al. |
| 2010/0118157 A1 | 5/2010 | Kameyama |
| 2012/0109915 A1 | 5/2012 | Krupnik et al. |
| 2012/0110491 A1 | 5/2012 | Cheung |
| 2012/0134595 A1 | 5/2012 | Fonseca et al. |
| 2013/0080359 A1 * | 3/2013 | Will ...................... B60W 40/06 |
| | | 706/12 |
| 2015/0104102 A1 | 4/2015 | Carreira et al. |
| 2016/0132786 A1 | 5/2016 | Balan et al. |
| 2016/0328856 A1 | 11/2016 | Mannino et al. |
| 2017/0011281 A1 | 1/2017 | Dijkman et al. |
| 2017/0147959 A1 * | 5/2017 | Sweeney ................ G07C 5/008 |
| 2017/0158134 A1 | 6/2017 | Shigemura |
| 2017/0206434 A1 | 7/2017 | Nariyambut et al. |
| 2017/0329346 A1 * | 11/2017 | Latotzki ............... G05D 1/0088 |
| 2018/0012411 A1 | 1/2018 | Richey et al. |
| 2018/0018590 A1 | 1/2018 | Szeto et al. |
| 2018/0039853 A1 | 2/2018 | Liu et al. |
| 2018/0067489 A1 | 3/2018 | Oder et al. |
| 2018/0068459 A1 | 3/2018 | Zhang et al. |
| 2018/0068540 A1 | 3/2018 | Romanenko et al. |
| 2018/0074506 A1 | 3/2018 | Branson |
| 2018/0121762 A1 | 5/2018 | Han et al. |
| 2018/0150081 A1 | 5/2018 | Gross et al. |
| 2018/0188040 A1 * | 7/2018 | Chen ...................... G01C 11/30 |
| 2018/0202822 A1 * | 7/2018 | DeLizio .................. B60R 25/24 |
| 2018/0211403 A1 | 7/2018 | Hotson et al. |
| 2018/0308012 A1 | 10/2018 | Mummadi et al. |
| 2018/0314878 A1 | 11/2018 | Lee et al. |
| 2018/0355511 A1 | 12/2018 | Misra et al. |
| 2018/0374105 A1 | 12/2018 | Azout et al. |

(56) References Cited

U.S. PATENT DOCUMENTS

| | | | |
|---|---|---|---|
| 2019/0004524 A1* | | 1/2019 | Wang .................. G01C 21/3415 |
| 2019/0023277 A1 | | 1/2019 | Roger et al. |
| 2019/0025773 A1 | | 1/2019 | Yang et al. |
| 2019/0042857 A1* | | 2/2019 | Endo .................. G01C 21/3602 |
| 2019/0042894 A1 | | 2/2019 | Anderson |
| 2019/0042919 A1 | | 2/2019 | Peysakhovich et al. |
| 2019/0042944 A1 | | 2/2019 | Nair et al. |
| 2019/0042948 A1 | | 2/2019 | Lee et al. |
| 2019/0057314 A1 | | 2/2019 | Julian et al. |
| 2019/0065637 A1 | | 2/2019 | Bogdoll et al. |
| 2019/0072978 A1 | | 3/2019 | Levi |
| 2019/0079526 A1 | | 3/2019 | Vallespi et al. |
| 2019/0080602 A1 | | 3/2019 | Rice et al. |
| 2019/0095780 A1 | | 3/2019 | Zhong et al. |
| 2019/0095946 A1 | | 3/2019 | Azout et al. |
| 2019/0101914 A1 | | 4/2019 | Coleman et al. |
| 2019/0108417 A1 | | 4/2019 | Talagala et al. |
| 2019/0122111 A1 | | 4/2019 | Min et al. |
| 2019/0130255 A1 | | 5/2019 | Yim et al. |
| 2019/0145765 A1 | | 5/2019 | Luo et al. |
| 2019/0146497 A1 | | 5/2019 | Urtasun et al. |
| 2019/0147112 A1 | | 5/2019 | Gordon |
| 2019/0147250 A1 | | 5/2019 | Zhang et al. |
| 2019/0147254 A1 | | 5/2019 | Bai et al. |
| 2019/0147255 A1 | | 5/2019 | Homayounfar et al. |
| 2019/0147335 A1 | | 5/2019 | Wang et al. |
| 2019/0147372 A1 | | 5/2019 | Luo et al. |
| 2019/0158784 A1 | | 5/2019 | Ahn et al. |
| 2019/0180154 A1 | | 6/2019 | Orlov et al. |
| 2019/0184981 A1* | | 6/2019 | Jung .................. G05D 1/0221 |
| 2019/0185010 A1 | | 6/2019 | Ganguli et al. |
| 2019/0189251 A1 | | 6/2019 | Horiuchi et al. |
| 2019/0197357 A1 | | 6/2019 | Anderson et al. |
| 2019/0204842 A1 | | 7/2019 | Jafari et al. |
| 2019/0205402 A1 | | 7/2019 | Sernau et al. |
| 2019/0205667 A1 | | 7/2019 | Avidan et al. |
| 2019/0217791 A1 | | 7/2019 | Bradley et al. |
| 2019/0227562 A1 | | 7/2019 | Mohammadiha et al. |
| 2019/0228037 A1 | | 7/2019 | Nicol et al. |
| 2019/0230282 A1 | | 7/2019 | Sypitkowski et al. |
| 2019/0235499 A1 | | 8/2019 | Kazemi et al. |
| 2019/0236437 A1 | | 8/2019 | Shin et al. |
| 2019/0243371 A1 | | 8/2019 | Nister et al. |
| 2019/0244138 A1 | | 8/2019 | Bhowmick et al. |
| 2019/0250622 A1 | | 8/2019 | Nister et al. |
| 2019/0250626 A1 | | 8/2019 | Ghafarianzadeh et al. |
| 2019/0250640 A1 | | 8/2019 | O'Flaherty et al. |
| 2019/0258878 A1 | | 8/2019 | Koivisto et al. |
| 2019/0266418 A1 | | 8/2019 | Xu et al. |
| 2019/0266610 A1 | | 8/2019 | Ghatage et al. |
| 2019/0272446 A1 | | 9/2019 | Kangaspunta et al. |
| 2019/0276041 A1 | | 9/2019 | Choi et al. |
| 2019/0279004 A1 | | 9/2019 | Kwon et al. |
| 2019/0286652 A1 | | 9/2019 | Habbecke et al. |
| 2019/0286972 A1 | | 9/2019 | El Husseini et al. |
| 2019/0287028 A1 | | 9/2019 | St Amant et al. |
| 2019/0289281 A1 | | 9/2019 | Badrinarayanan et al. |
| 2019/0294177 A1 | | 9/2019 | Kwon et al. |
| 2019/0294975 A1 | | 9/2019 | Sachs |
| 2019/0299978 A1* | | 10/2019 | Balakrishnan ....... G05D 1/0221 |
| 2019/0311290 A1 | | 10/2019 | Huang et al. |
| 2019/0318099 A1 | | 10/2019 | Carvalho et al. |
| 2019/0325088 A1 | | 10/2019 | Dubey et al. |
| 2019/0325266 A1 | | 10/2019 | Klepper et al. |
| 2019/0325269 A1 | | 10/2019 | Bagherinezhad et al. |
| 2019/0325580 A1 | | 10/2019 | Lukac et al. |
| 2019/0325595 A1 | | 10/2019 | Stein et al. |
| 2019/0329790 A1 | | 10/2019 | Nandakumar et al. |
| 2019/0332875 A1 | | 10/2019 | Vallespi-Gonzalez et al. |
| 2019/0333232 A1 | | 10/2019 | Vallespi-Gonzalez et al. |
| 2019/0336063 A1 | | 11/2019 | Dascalu |
| 2019/0339989 A1 | | 11/2019 | Liang et al. |
| 2019/0340462 A1 | | 11/2019 | Pao et al. |
| 2019/0340492 A1 | | 11/2019 | Burger et al. |
| 2019/0340499 A1 | | 11/2019 | Burger et al. |
| 2019/0347501 A1 | | 11/2019 | Kim et al. |
| 2019/0349571 A1 | | 11/2019 | Herman et al. |
| 2019/0354782 A1 | | 11/2019 | Kee et al. |
| 2019/0354786 A1 | | 11/2019 | Lee et al. |
| 2019/0354808 A1 | | 11/2019 | Park et al. |
| 2019/0354817 A1 | | 11/2019 | Shlens et al. |
| 2019/0354850 A1 | | 11/2019 | Watson et al. |
| 2019/0370398 A1 | | 12/2019 | He et al. |
| 2019/0370575 A1 | | 12/2019 | Nandakumar et al. |
| 2019/0370935 A1 | | 12/2019 | Chang et al. |
| 2019/0373322 A1 | | 12/2019 | Rojas-Echenique et al. |
| 2019/0377345 A1 | | 12/2019 | Bachrach et al. |
| 2019/0377965 A1 | | 12/2019 | Totolos et al. |
| 2019/0378049 A1 | | 12/2019 | Widmann et al. |
| 2019/0378051 A1 | | 12/2019 | Widmann et al. |
| 2019/0382007 A1 | | 12/2019 | Casas et al. |
| 2019/0384303 A1 | | 12/2019 | Muller et al. |
| 2019/0384304 A1 | | 12/2019 | Towal et al. |
| 2019/0384309 A1 | | 12/2019 | Silva et al. |
| 2019/0384994 A1 | | 12/2019 | Frossard et al. |
| 2019/0385048 A1 | | 12/2019 | Cassidy et al. |
| 2019/0385360 A1 | | 12/2019 | Yang et al. |
| 2020/0004259 A1 | | 1/2020 | Gulino et al. |
| 2020/0004351 A1 | | 1/2020 | Marchant et al. |
| 2020/0012936 A1 | | 1/2020 | Lee et al. |
| 2020/0017117 A1 | | 1/2020 | Milton |
| 2020/0019179 A1* | | 1/2020 | Schuller .................. G08G 1/168 |
| 2020/0025931 A1 | | 1/2020 | Liang et al. |
| 2020/0026282 A1 | | 1/2020 | Choe et al. |
| 2020/0026283 A1 | | 1/2020 | Barnes et al. |
| 2020/0026992 A1 | | 1/2020 | Zhang et al. |
| 2020/0027210 A1 | | 1/2020 | Haemel et al. |
| 2020/0033858 A1 | | 1/2020 | Xiao |
| 2020/0033865 A1 | | 1/2020 | Mellinger et al. |
| 2020/0034665 A1 | | 1/2020 | Ghanta et al. |
| 2020/0034710 A1 | | 1/2020 | Sidhu et al. |
| 2020/0036948 A1 | | 1/2020 | Song |
| 2020/0039520 A1 | | 2/2020 | Misu et al. |
| 2020/0051550 A1 | | 2/2020 | Baker |
| 2020/0060757 A1 | | 2/2020 | Ben-Haim et al. |
| 2020/0065711 A1 | | 2/2020 | Clément et al. |
| 2020/0065879 A1 | | 2/2020 | Hu et al. |
| 2020/0069973 A1 | | 3/2020 | Lou et al. |
| 2020/0073385 A1 | | 3/2020 | Jobanputra et al. |
| 2020/0074230 A1 | | 3/2020 | Englard et al. |
| 2020/0086880 A1 | | 3/2020 | Poeppel et al. |
| 2020/0089243 A1 | | 3/2020 | Poeppel et al. |
| 2020/0089969 A1 | | 3/2020 | Lakshmi et al. |
| 2020/0090056 A1 | | 3/2020 | Singhal et al. |
| 2020/0097841 A1 | | 3/2020 | Petousis et al. |
| 2020/0098095 A1 | | 3/2020 | Borcs et al. |
| 2020/0103894 A1 | | 4/2020 | Cella et al. |
| 2020/0104705 A1 | | 4/2020 | Bhowmick et al. |
| 2020/0110416 A1 | | 4/2020 | Hong et al. |
| 2020/0117180 A1 | | 4/2020 | Cella et al. |
| 2020/0117889 A1 | | 4/2020 | Laput et al. |
| 2020/0117916 A1 | | 4/2020 | Liu |
| 2020/0117917 A1 | | 4/2020 | Yoo |
| 2020/0118035 A1 | | 4/2020 | Asawa et al. |
| 2020/0125844 A1 | | 4/2020 | She et al. |
| 2020/0125845 A1 | | 4/2020 | Hess et al. |
| 2020/0126129 A1 | | 4/2020 | Lkhamsuren et al. |
| 2020/0134427 A1 | | 4/2020 | Oh et al. |
| 2020/0134461 A1 | | 4/2020 | Chai et al. |
| 2020/0134466 A1 | | 4/2020 | Weintraub et al. |
| 2020/0134848 A1 | | 4/2020 | El-Khamy et al. |
| 2020/0143231 A1 | | 5/2020 | Fusi et al. |
| 2020/0143279 A1 | | 5/2020 | West et al. |
| 2020/0148201 A1 | | 5/2020 | King et al. |
| 2020/0149898 A1 | | 5/2020 | Felip et al. |
| 2020/0151201 A1 | | 5/2020 | Chandrasekhar et al. |
| 2020/0151619 A1 | | 5/2020 | Mopur et al. |
| 2020/0151692 A1 | | 5/2020 | Gao et al. |
| 2020/0158822 A1 | | 5/2020 | Owens et al. |
| 2020/0158869 A1 | | 5/2020 | Amirloo et al. |
| 2020/0159225 A1 | | 5/2020 | Zeng et al. |
| 2020/0160064 A1 | | 5/2020 | Wang et al. |
| 2020/0160104 A1 | | 5/2020 | Urtasun et al. |
| 2020/0160117 A1 | | 5/2020 | Urtasun et al. |

(56) References Cited

U.S. PATENT DOCUMENTS

| | | |
|---|---|---|
| 2020/0160178 A1 | 5/2020 | Kar et al. |
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |
| 2020/0160598 A1 | 5/2020 | Manivasagam et al. |
| 2020/0162489 A1 | 5/2020 | Bar-Nahum et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |
| 2020/0192389 A1 | 6/2020 | ReMine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |
| 2020/0202196 A1 | 6/2020 | Guo et al. |
| 2020/0209857 A1 | 7/2020 | Djuric et al. |
| 2020/0209867 A1 | 7/2020 | Valois et al. |
| 2020/0209874 A1 | 7/2020 | Chen et al. |
| 2020/0210717 A1 | 7/2020 | Hou et al. |
| 2020/0210769 A1 | 7/2020 | Hou et al. |
| 2020/0210777 A1 | 7/2020 | Valois et al. |
| 2020/0216064 A1 | 7/2020 | du Toit et al. |
| 2020/0218722 A1 | 7/2020 | Mai et al. |
| 2020/0218979 A1 | 7/2020 | Kwon et al. |
| 2020/0223434 A1 | 7/2020 | Campos et al. |
| 2020/0225758 A1 | 7/2020 | Tang et al. |
| 2020/0226377 A1 | 7/2020 | Campos et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242511 A1 | 7/2020 | Kale et al. |
| 2020/0245869 A1 | 8/2020 | Sivan et al. |
| 2020/0249685 A1 | 8/2020 | Elluswamy et al. |
| 2020/0250456 A1 | 8/2020 | Wang et al. |
| 2020/0250515 A1 | 8/2020 | Rifkin et al. |
| 2020/0250874 A1 | 8/2020 | Assouline et al. |
| 2020/0257301 A1 | 8/2020 | Weiser et al. |
| 2020/0257306 A1 | 8/2020 | Nisenzon |
| 2020/0258057 A1 | 8/2020 | Farahat et al. |
| 2020/0265247 A1 | 8/2020 | Musk et al. |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293796 A1 | 9/2020 | Sajjadi et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo et al. |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manlvasagam et al. |
| 2020/0302276 A1 | 9/2020 | Yang et al. |
| 2020/0302291 A1 | 9/2020 | Hong |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov et al. |
| 2020/0315708 A1 | 10/2020 | Mosnier et al. |
| 2020/0320132 A1 | 10/2020 | Neumann |
| 2020/0324073 A1 | 10/2020 | Rajan et al. |
| 2020/0327192 A1 | 10/2020 | Hackman et al. |
| 2020/0327443 A1 | 10/2020 | Van et al. |
| 2020/0327449 A1 | 10/2020 | Tiwari et al. |
| 2020/0327662 A1 | 10/2020 | Liu et al. |
| 2020/0327667 A1 | 10/2020 | Arbel et al. |
| 2020/0331476 A1 | 10/2020 | Chen et al. |
| 2020/0334416 A1 | 10/2020 | Vianu et al. |
| 2020/0334495 A1 | 10/2020 | Al et al. |
| 2020/0334501 A1 | 10/2020 | Lin et al. |
| 2020/0334551 A1 | 10/2020 | Javidi et al. |
| 2020/0334574 A1 | 10/2020 | Ishida |
| 2020/0337648 A1 | 10/2020 | Saripalli et al. |
| 2020/0341466 A1 | 10/2020 | Pham et al. |
| 2020/0342350 A1 | 10/2020 | Madar et al. |
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk et al. |
| 2020/0361083 A1 | 11/2020 | Mousavian et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano et al. |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0396394 A1 | 12/2020 | Zlokolica et al. |
| 2020/0398855 A1 | 12/2020 | Thompson |
| 2020/0401850 A1 | 12/2020 | Bazarsky et al. |
| 2020/0401886 A1 | 12/2020 | Deng et al. |
| 2020/0402155 A1 | 12/2020 | Kurian et al. |
| 2020/0402226 A1 | 12/2020 | Peng |
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella et al. |
| 2021/0004663 A1 | 1/2021 | Park et al. |
| 2021/0006835 A1 | 1/2021 | Slattery et al. |
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1 | 1/2021 | McGavran et al. |
| 2021/0030276 A1 | 2/2021 | Li et al. |
| 2021/0034921 A1 | 2/2021 | Pinkovich et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0049378 A1 | 2/2021 | Gautam et al. |
| 2021/0049455 A1 | 2/2021 | Kursun |

(56) References Cited

U.S. PATENT DOCUMENTS

| | | | |
|---|---|---|---|
| 2021/0049456 A1 | 2/2021 | Kursun | |
| 2021/0049548 A1 | 2/2021 | Grisz et al. | |
| 2021/0049700 A1 | 2/2021 | Nguyen et al. | |
| 2021/0056114 A1 | 2/2021 | Price et al. | |
| 2021/0056306 A1 | 2/2021 | Hu et al. | |
| 2021/0056317 A1 | 2/2021 | Golov | |
| 2021/0056420 A1 | 2/2021 | Konishi et al. | |
| 2021/0056701 A1 | 2/2021 | Vranceanu et al. | |

FOREIGN PATENT DOCUMENTS

| | | |
|---|---|---|
| CN | 110599537 A | 12/2010 |
| CN | 102737236 A | 10/2012 |
| CN | 103366339 A | 10/2013 |
| CN | 104835114 A | 8/2015 |
| CN | 103236037 B | 5/2016 |
| CN | 103500322 B | 8/2016 |
| CN | 106419893 A | 2/2017 |
| CN | 106504253 A | 3/2017 |
| CN | 107031600 A | 8/2017 |
| CN | 107169421 A | 9/2017 |
| CN | 107507134 A | 12/2017 |
| CN | 107885214 A | 4/2018 |
| CN | 108122234 A | 6/2018 |
| CN | 107133943 B | 7/2018 |
| CN | 107368926 B | 7/2018 |
| CN | 105318888 B | 8/2018 |
| CN | 108491889 A | 9/2018 |
| CN | 108647591 A | 10/2018 |
| CN | 108710865 A | 10/2018 |
| CN | 105550701 B | 11/2018 |
| CN | 108764185 A | 11/2018 |
| CN | 108845574 A | 11/2018 |
| CN | 108898177 A | 11/2018 |
| CN | 109086867 A | 12/2018 |
| CN | 107103113 B | 1/2019 |
| CN | 109215067 A | 1/2019 |
| CN | 109359731 A | 2/2019 |
| CN | 109389207 A | 2/2019 |
| CN | 109389552 A | 2/2019 |
| CN | 106779060 B | 3/2019 |
| CN | 109579856 A | 4/2019 |
| CN | 109615073 A | 4/2019 |
| CN | 106156754 B | 5/2019 |
| CN | 106598226 B | 5/2019 |
| CN | 106650922 B | 5/2019 |
| CN | 109791626 A | 5/2019 |
| CN | 109901595 A | 6/2019 |
| CN | 109902732 A | 6/2019 |
| CN | 109934163 A | 6/2019 |
| CN | 109948428 A | 6/2019 |
| CN | 109949257 A | 6/2019 |
| CN | 109951710 A | 6/2019 |
| CN | 109975308 A | 7/2019 |
| CN | 109978132 A | 7/2019 |
| CN | 109978161 A | 7/2019 |
| CN | 110060202 A | 7/2019 |
| CN | 110069071 A | 7/2019 |
| CN | 110084086 A | 8/2019 |
| CN | 110096937 A | 8/2019 |
| CN | 110111340 A | 8/2019 |
| CN | 110135485 A | 8/2019 |
| CN | 110197270 B | 9/2019 |
| CN | 110310264 A | 10/2019 |
| CN | 110321965 A | 10/2019 |
| CN | 110334801 A | 10/2019 |
| CN | 110399875 A | 11/2019 |
| CN | 110414362 A | 11/2019 |
| CN | 110426051 A | 11/2019 |
| CN | 110473173 A | 11/2019 |
| CN | 110516665 A | 11/2019 |
| CN | 110543837 A | 12/2019 |
| CN | 110569899 A | 12/2019 |
| CN | 110599864 A | 12/2019 |
| CN | 110619282 A | 12/2019 |
| CN | 110619283 A | 12/2019 |
| CN | 110619330 A | 12/2019 |
| CN | 110659628 A | 1/2020 |
| CN | 110688992 A | 1/2020 |
| CN | 107742311 B | 2/2020 |
| CN | 110751280 A | 2/2020 |
| CN | 110826566 A | 2/2020 |
| CN | 107451659 B | 4/2020 |
| CN | 108111873 B | 4/2020 |
| CN | 110956185 A | 4/2020 |
| CN | 110966991 A | 4/2020 |
| CN | 111027549 A | 4/2020 |
| CN | 111027575 A | 4/2020 |
| CN | 111047225 A | 4/2020 |
| CN | 111126453 A | 5/2020 |
| CN | 111158355 A | 5/2020 |
| CN | 107729998 B | 6/2020 |
| CN | 108549934 B | 6/2020 |
| CN | 111275129 A | 6/2020 |
| CN | 111275618 A | 6/2020 |
| CN | 111326023 A | 6/2020 |
| CN | 111428943 A | 7/2020 |
| CN | 111444821 A | 7/2020 |
| CN | 111445420 A | 7/2020 |
| CN | 111461052 A | 7/2020 |
| CN | 111461053 A | 7/2020 |
| CN | 111461110 A | 7/2020 |
| CN | 110225341 B | 8/2020 |
| CN | 111307162 B | 8/2020 |
| CN | 111488770 A | 8/2020 |
| CN | 111539514 A | 8/2020 |
| CN | 111565318 A | 8/2020 |
| CN | 111582216 A | 8/2020 |
| CN | 111598095 A | 8/2020 |
| CN | 108229526 B | 9/2020 |
| CN | 111693972 A | 9/2020 |
| CN | 106558058 B | 10/2020 |
| CN | 107169560 B | 10/2020 |
| CN | 107622258 B | 10/2020 |
| CN | 111767801 A | 10/2020 |
| CN | 111768002 A | 10/2020 |
| CN | 111783545 A | 10/2020 |
| CN | 111783971 A | 10/2020 |
| CN | 111797657 A | 10/2020 |
| CN | 111814623 A | 10/2020 |
| CN | 111814902 A | 10/2020 |
| CN | 111860499 A | 10/2020 |
| CN | 111881856 A | 11/2020 |
| CN | 111882579 A | 11/2020 |
| CN | 111897639 A | 11/2020 |
| CN | 111898507 A | 11/2020 |
| CN | 111898523 A | 11/2020 |
| CN | 111899227 A | 11/2020 |
| CN | 112101175 A | 12/2020 |
| CN | 112101562 A | 12/2020 |
| CN | 112115953 A | 12/2020 |
| CN | 111062973 B | 1/2021 |
| CN | 111275080 B | 1/2021 |
| CN | 112183739 A | 1/2021 |
| CN | 112232497 A | 1/2021 |
| CN | 112288658 A | 1/2021 |
| CN | 112308095 A | 2/2021 |
| CN | 112308799 A | 2/2021 |
| CN | 112313663 A | 2/2021 |
| CN | 112329552 A | 2/2021 |
| CN | 112348783 A | 2/2021 |
| CN | 111899245 B | 3/2021 |
| DE | 202017102235 U1 | 5/2017 |
| DE | 202017102238 U1 | 5/2017 |
| DE | 102016219698 | 4/2018 |
| DE | 102017116017 A1 | 1/2019 |
| DE | 102018130821 A1 | 6/2020 |
| DE | 102019008316 A1 | 8/2020 |
| EP | 1215626 B1 | 9/2008 |
| EP | 2228666 B1 | 9/2012 |
| EP | 2420408 B1 | 5/2013 |
| EP | 2723069 A1 | 4/2014 |
| EP | 2741253 A1 | 6/2014 |
| EP | 3115772 A1 | 1/2017 |

(56) References Cited

FOREIGN PATENT DOCUMENTS

| | | |
|---|---|---|
| EP | 2618559 B1 | 8/2017 |
| EP | 3285485 A1 | 2/2018 |
| EP | 2863633 B1 | 2/2019 |
| EP | 3113080 B1 | 5/2019 |
| EP | 3525132 A1 | 8/2019 |
| EP | 3531689 A1 | 8/2019 |
| EP | 3537340 A1 | 9/2019 |
| EP | 3543917 A1 | 9/2019 |
| EP | 3608840 A1 | 2/2020 |
| EP | 3657387 A1 | 5/2020 |
| EP | 2396750 B1 | 6/2020 |
| EP | 3664020 A1 | 6/2020 |
| EP | 3690712 A1 | 8/2020 |
| EP | 3690742 A1 | 8/2020 |
| EP | 3722992 A1 | 10/2020 |
| EP | 3690730 A2 | 11/2020 |
| EP | 3739486 A1 | 11/2020 |
| EP | 3501897 B1 | 12/2020 |
| EP | 3751455 A2 | 12/2020 |
| EP | 3783527 A1 | 2/2021 |
| GB | 2402572 B | 8/2005 |
| GB | 2548087 A | 9/2017 |
| GB | 2577485 A | 4/2020 |
| GB | 2517270 B | 6/2020 |
| JP | 2578262 Y2 | 8/1998 |
| JP | 3941252 B2 | 7/2007 |
| JP | 4282583 B2 | 6/2009 |
| JP | 4300098 B2 | 7/2009 |
| JP | 2015004922 A | 1/2015 |
| JP | 5863536 B2 | 2/2016 |
| JP | 6044134 B2 | 12/2016 |
| JP | 6525707 B2 | 6/2019 |
| JP | 2019101535 A | 6/2019 |
| JP | 2020101927 A | 7/2020 |
| JP | 2020173744 A | 10/2020 |
| KR | 100326702 B1 | 2/2002 |
| KR | 101082878 B1 | 11/2011 |
| KR | 101738422 B1 | 5/2017 |
| KR | 101969864 B1 | 4/2019 |
| KR | 101996167 B1 | 7/2019 |
| KR | 102022388 B1 | 8/2019 |
| KR | 102043143 B1 | 11/2019 |
| KR | 102095335 B1 | 3/2020 |
| KR | 102097120 B1 | 4/2020 |
| KR | 1020200085490 A | 7/2020 |
| KR | 102189262 B1 | 12/2020 |
| KR | 1020200142266 A | 12/2020 |
| TW | 200630819 A | 9/2006 |
| TW | I294089 B | 3/2008 |
| TW | I306207 B | 2/2009 |
| WO | WO 02/052835 | 7/2002 |
| WO | WO 16/032398 | 3/2016 |
| WO | WO 16/048108 | 3/2016 |
| WO | WO 16/207875 | 12/2016 |
| WO | WO 17/158622 | 9/2017 |
| WO | WO 19/005547 | 1/2019 |
| WO | WO 19/067695 | 4/2019 |
| WO | WO 19/089339 | 5/2019 |
| WO | WO 19/092456 | 5/2019 |
| WO | WO 19/099622 | 5/2019 |
| WO | WO 19/122952 | 6/2019 |
| WO | WO 19/125191 | 6/2019 |
| WO | WO 19/126755 | 6/2019 |
| WO | WO 19/144575 | 8/2019 |
| WO | WO 19/182782 | 9/2019 |
| WO | WO 19/191578 | 10/2019 |
| WO | WO 19/216938 | 11/2019 |
| WO | WO 19/220436 | 11/2019 |
| WO | WO 20/006154 | 1/2020 |
| WO | WO 20/012756 | 1/2020 |
| WO | WO 20/025696 | 2/2020 |
| WO | WO 20/034663 | 2/2020 |
| WO | WO 20/056157 | 3/2020 |
| WO | WO 20/076356 | 4/2020 |
| WO | WO 20/097221 | 5/2020 |
| WO | WO 20/101246 | 5/2020 |
| WO | WO 20/120050 | 6/2020 |
| WO | WO 20/121973 | 6/2020 |
| WO | WO 20/131140 | 6/2020 |
| WO | WO 20/139181 | 7/2020 |
| WO | WO 20/139355 | 7/2020 |
| WO | WO 20/139357 | 7/2020 |
| WO | WO 20/142193 | 7/2020 |
| WO | WO 20/146445 | 7/2020 |
| WO | WO 20/151329 | 7/2020 |
| WO | WO 20/157761 | 8/2020 |
| WO | WO 20/163455 | 8/2020 |
| WO | WO 20/167667 | 8/2020 |
| WO | WO 20/174262 | 9/2020 |
| WO | WO 20/177583 | 9/2020 |
| WO | WO 20/185233 | 9/2020 |
| WO | WO 20/185234 | 9/2020 |
| WO | WO 20/195658 | 10/2020 |
| WO | WO 20/198189 | 10/2020 |
| WO | WO 20/198779 | 10/2020 |
| WO | WO 20/205597 | 10/2020 |
| WO | WO 20/221200 | 11/2020 |
| WO | WO 20/240284 | 12/2020 |
| WO | WO 20/260020 | 12/2020 |
| WO | WO 20/264010 | 12/2020 |

* cited by examiner

AUTONOMOUS AND USER CONTROLLED VEHICLE SUMMON TO A TARGET

BACKGROUND OF THE INVENTION

Human drivers are typically required to operate vehicles and the driving tasks performed by them are often complex and can be exhausting. For example, retrieving or summoning a parked car from a crowded parking lot or garage can be inconvenient and tedious. The maneuver often involves walking towards one's vehicle, three-point turns, edging out of tight spots without touching neighboring vehicles or walls, and driving towards a location that one previously came from. Although some vehicles are capable of being remotely operated, the route driven by the vehicle is typically limited to a single straight-line path in either the forwards or reverse direction with limited steering range and no intelligence in navigating the vehicle along its own path.

BRIEF DESCRIPTION OF THE DRAWINGS

Various embodiments of the invention are disclosed in the following detailed description and the accompanying drawings.

DETAILED DESCRIPTION

Figure 1:
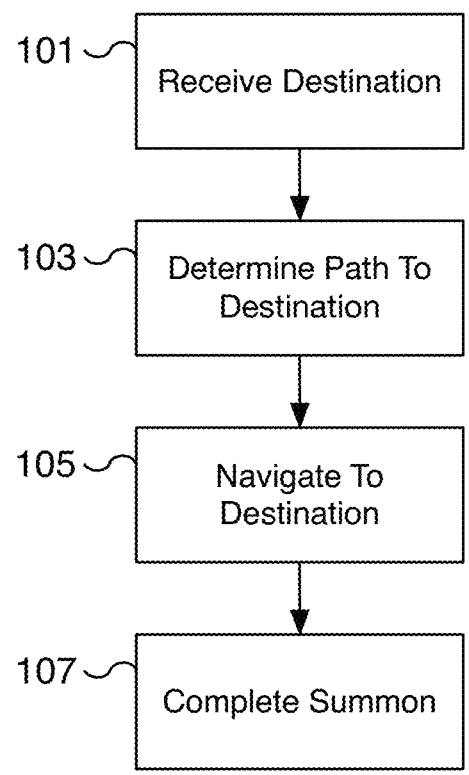
FIG. 1 is a flow diagram illustrating an embodiment of a process for automatically navigating a vehicle to a destination target.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique to autonomously summon a vehicle to a destination is disclosed. A target geographical location is provided and a vehicle automatically navigates to the target location. For example, a user provides a location by dropping a pin on a graphical map user interface at the destination location. As another example, a user summons the vehicle to the user's location by specifying the user's location as the destination location. The user may also select a destination location based on viable paths detected for the vehicle. The destination location may update (for example if the user moves around) leading the car to update its path to the destination location. Using the specified destination location, the vehicle navigates by utilizing sensor data such as vision data captured by cameras to generate a representation of the environment surrounding the vehicle. In some embodiments, the representation is an occupancy grid detailing drivable and non-drivable space. In some embodiments, the occupancy grid is generated using a neural network from camera sensor data. The representation of the environment may be further augmented with auxiliary data such as additional sensor data (including radar data), map data, or other inputs. Using the generated representation, a path is planned from the vehicle's current location towards the destination location. In some embodiments, the path is generated based on the vehicle's operating parameters such as the model's turning radius, vehicle width, vehicle length, etc. An optimal path is selected based on selection parameters such as distance, speed, number of changes in gear, etc. As the vehicle automatically navigates using the selected path, the representation of the environment is continuously updated. For example, as the vehicle travels to the destination, new sensor data is captured and the occupancy grid is updated. Safety checks are continuously performed that can override or modify the automatic navigation. For example, ultrasonic sensors may be utilized to detect potential collisions. A user can monitor the navigation and cancel the summoned vehicle at any time. In some embodiments, the vehicle must continually receive a virtual heartbeat signal from the user for the vehicle to continue navigating. The virtual heartbeat may be used to indicate that the user is actively monitoring the progress of the vehicle. In some embodiments, the user selects the path and the user remotely controls the vehicle. For example, the user can control the steering angle, direction, and/or speed of the vehicle to remotely control the vehicle. As the user remotely controls the vehicle, safety checks are continuously performed that can override and/or modify the user controls. For example, the vehicle can be stopped if an object is detected.

In some embodiments, a system comprises a processor configured to receive an identification of a geographical location associated with a target specified by a user remote from a vehicle. For example, a user waiting at a pick up location specifies her or his geographical location as a destination target. The destination target is received by a vehicle parked in a remote parking spot. In some embodiments, a machine learning model is utilized to generate a representation of at least a portion of an environment surrounding a vehicle using sensor data from one or more sensors of the vehicle. For example, sensors such as camera, radar, ultrasonic or other sensors capture data of the environment surrounding the vehicle. The data is fed as input to a neural network using a trained machine learning model to generate a representation of the environment surrounding the vehicle. As an example, the representation may be an occupancy grid describing drivable space the vehicle can use to navigate through. In some embodiments, at least a portion of a path is calculated to a target location corresponding to the received geographical location using the generated representation of at least the portion of the environment surrounding the vehicle. For example, using an occupancy grid representing the environment surrounding the vehicle, a path is selected to navigate the vehicle to a target destination. Values at entries in the occupancy grid may be probabilities and/or costs associated with driving through the location associated with the grid entry. In some embodiments, at least one command is provided to automatically navigate the vehicle based on the determined path and updated sensor data from at least a portion of the one or more sensors of the vehicle. For example, a vehicle controller uses the selected plan to provide actuator commands to control the vehicle's speed and steering. The commands are used to navigate the vehicle along the selected path. As the vehicle navigates, updated sensor data is captured to update the representation of the vehicle's surrounding environment. In various embodiments, the system comprises a memory coupled to the processor and configured to provide the processor with instructions.

FIG. 1 is a flow diagram illustrating an embodiment of a process for automatically navigating a vehicle to a destination target. In some embodiments, the process of FIG. 1 is used to summon a vehicle to a geographical location specified by a user. The user may use a mobile app, the key fob, a GUI of the vehicle, etc. to specify a target location. Using the target location, the vehicle automatically navigates from its starting location to the target location. In some embodiments, the target location is the location of the user and the target location is dynamic. For example, as the user moves, the target destination of the vehicle moves to the new location of the user. In some embodiments, the target location is specified indirectly, such as via a calendar or planning software. For example, a calendar of the user is parsed and used to determine a target destination and time from calendar events. A calendar event may include the location of the event and a time, such as the ending time. The destination is selected based on the location of the event and the time is selected based on the ending time of the event. The vehicle automatically navigates to arrive at the location at the ending time, such as the end of a dinner party, a wedding, a restaurant reservation, etc. In some embodiments, the vehicle navigates to the target destination using a specified time, such as an arrival or departure time. For example, a user can specify the time the vehicle should begin automatically navigating or departing to the specified destination. As another example, a user can specify the time the vehicle should arrive at the specified destination. The vehicle will then depart in advance of the specified time in order to arrive at the destination at the specified time. In some embodiments, the arrival time is configured with a threshold time to allow for differences between the estimated travel time and the actual travel time. In various embodiments, the process of FIG. 1 is run on an autonomous vehicle. In some embodiments, a remote server in communication with the autonomous vehicle executes portions of the summon functionality. In some embodiments, the process of FIG. 1 is implemented at least in part using the autonomous vehicle system of FIG. 7.

At 101, a destination is received. For example, a user selects a "find me" feature from a mobile application on a smartphone device. The "find me" feature determines the location of the user and transmits the user's location to a vehicle summon module. In various embodiments, the vehicle summon module is implemented across one or more modules that may exist on the vehicle and/or remote from the vehicle. In some embodiments, the target destination may not be the user's location. For example, the user may select a location on a map that is the target destination. As another example, location may be based on a location associated with a calendar event. In some embodiments, the location is selected by dropping a pin icon on a map at the target destination. The location may be a longitude and latitude. In some embodiments, the location may include an altitude, elevation, or similar measure. For example, in a parking garage, the location includes an altitude component to distinguish between different floors of a multi-floor parking garage. In various embodiments, the destination is a geographical location.

In some embodiments, the destination includes a location as well as an orientation. For example, a car icon, a triangle icon, or another icon with an orientation is used to specify both a location and orientation. By specifying an orientation, the vehicle navigates to the selected target destination and faces the intended orientation that the user selects. In some embodiments, the orientation is determined by orientation suggestions, such as suggestions based on the environment, the user, other vehicles, and/or other appropriate inferences. For example, a map may be used to determine the proper orientation for vehicles, such as the direction vehicles should travel on a one-way road. As another example, based on lane lines, traffic signals, other vehicles, etc., the summon functionality determines an appropriate orientation of the road. For example, the direction other vehicles are facing can be used as an orientations suggestion. In some embodiments, the orientation is based on the orientation suggested by other autonomous vehicles. For example, in some embodiments, the vehicle summon functionality can communicate and/or query other vehicles to determine their orientation and use the provided result as an orientation suggestion. In various embodiments, one or more orientation suggestions are weighted and used to determine a target destination orientation.

In some embodiments, the destination is determined by fulfilling a query. For example, a user may request, for example using a GUI, voice, or another query type, her or his vehicle to arrive at a specified parking lot at a certain time. The destination is determined by querying a search engine, such as a map search database, for the destination parking lot. The user's calendar and/or address book may be used to refine the search results. Once the parking lot is identified, instructions and/or traffic flow for entering and/or exiting the parking lot are determined and used for selecting a destination. The destination is then provided to the vehicle summons module.

In some embodiments, the destination received is a multipart destination. For example, the destination requires arriving at one or more waypoints before reaching the final destination. The waypoints may be used to exercise additional control over the path the vehicle takes in navigating to the final destination. For example, the waypoints may be used to follow a preferred traffic pattern for an airport, parking lot, or another destination. The waypoints may be used to pick up one or more additional passengers, etc. For example, delays and/or pauses can be incorporated into the destination to pick up and/or drop off passengers or objects.

In some embodiments, the destination received is first passed through one or more validation and/or safety checks. For example, a destination may be limited based on distance such that a user can only select a destination within a certain distance (or radius) from the vehicle, such as 100 meters, 10 meters, or another appropriate distance. In some embodiments, the distance is based on local rules and/or regulations. In some embodiments, the destination location must be a valid stopping location. For example, a sidewalk, a crosswalk, an intersection, a lake, etc. are typically not valid stopping locations and the user may be prompted to select a valid location. In some embodiments, the destination received is modified from the user's initial selected destination to account for safety concerns, such as enforcing a valid stopping location.

At 103, a path to the destination is determined. For example, one or more paths are determined to navigate the vehicle from its current location to the destination received at 101. In some embodiments, the paths are determined using a path planner module, such as path planner module 705 of FIG. 7. In various embodiments, the path planner module may be implemented using a cost function with appropriate weights applied to different paths to the destination. In some embodiments, the path selected is based on potential path arcs originating from the vehicle location. The potential path arcs are limited to the vehicle's operating dynamics, such as the vehicles steering range. In various embodiments, each potential path has a cost. For example, potential paths with sharp turns are have higher cost than paths that are smoother. As another example, a potential path with a large change in speed has higher cost than a path with a small change in speed. As yet another example, a potential path with more changes in gear (e.g., changes from reverse to forward) has higher cost than a path with fewer changes in gear. In some embodiments, a path with a higher likelihood of encountering certain objects is weighted differently than a path with a lower likelihood of encountering objects. For example, a path is weighted based on the likelihood of encountering pedestrians, vehicles, animals, traffic, poor lighting, poor weather, tolls, etc. In various embodiments, high cost paths are not preferred over lower cost paths when determining the path to take to the destination.

At 105, the vehicle navigates to the destination. Using the path to the destination determined at 103, the vehicle automatically navigates to the destination received at 101. In some embodiments, the path is made up of multiple smaller sub-paths. Different sub-paths may be implemented by traveling in different gears, such as forwards or reverse. In some embodiments, the paths include actions such as opening a garage door, closing a garage door, passing through a parking gate, waiting for a car lift, confirming a toll payment, charging, making a call, sending a message, etc. The additional actions may require stopping the vehicle and/or executing actions to manipulate the surrounding environment. In some scenarios, the final destination is a destination that is close to the destination received at 101. For example, in some scenarios, the destination received at 101 is not reachable so the final destination closely approximates reaching that destination. For example, in the event a user selects a sidewalk, the final destination is a position on a road adjacent to the sidewalk. As another example, in the event the user selects a crosswalk, the final destination is a position on a road near the crosswalk but not in the crosswalk.

In some embodiments, one or more safety checks are continuously confirmed while navigating. For example, auxiliary data such as sensor data from ultrasonic or other sensors is used to identify obstacles such as pedestrians, vehicles, speed bumps, traffic control signals, etc. A likelihood of a potential collision with the object terminates the current navigation and/or modifies the path to the destination. In some embodiments, the path to the destination includes the speed to travel along the path. As another example, in some embodiments, a heartbeat from the user's mobile application must be received for navigation to continue. The heartbeat may be implemented by requiring the user to maintain a connection with the vehicle being summoned, for example, by continuously pressing down a button GUI element in a mobile summon application. As another example, the user must continue to hold down a button (or maintain contact with a sensor) on the key fob for the vehicle to automatically navigate. In the event contact is lost, the automatic navigation will terminate. In some embodiments, the termination of the navigation safely slows down the vehicle and puts the vehicle in a safe, resting mode, such as parked along the side of the road, in a nearby parking space, etc. In some embodiments, loss of contact may, depending on the scenario, immediately stop the vehicle. For example, a user may release a summon button on the mobile app to indicate the vehicle should stop immediately, similar to a dead man's switch. In various embodiments, the deceleration applied to stop the vehicle depends on the environment of the vehicle (for example, whether other vehicles are traveling nearby such as behind the vehicle), whether there are potential collisions such as an obstacle or pedestrian in front of the path of the vehicle, the speed the vehicle is traveling, or other appropriate parameters. In some embodiments, the speed the vehicle travels is limited, for example, to a low maximum speed.

At 107, the vehicle summon functionality is completed. On completion, one or more completion actions may be executed. For example, a notification that the vehicle has reached the selected target destination is sent. In some embodiments, the vehicle reaches a destination that approximates that target destination and a notification is presented to the user of the vehicle's location. In some embodiments, the notification is sent to a mobile application, a key fob (e.g., indicated by a change in state associated with the key fob), via a text message, and/or via another appropriate notification channel. Additional directions may be provided to direct the user to the vehicle. In various embodiments, the vehicle may be placed into park and one or more vehicle settings may be triggered. For example, the interior lighting of the vehicle may be turned on. Floor lighting may be enabled to increase visibility for entering the vehicle. One or more exterior lights may be turned on, such as blinkers, parking, and/or hazard lights. Exterior lights, such as front headlights, may be activated to increase visibility for passengers approaching the vehicle. Actuated directional lights may be directed towards the expected direction from which passengers will be arriving to reach the vehicle. In some embodiments, audio notifications such as an audio alert or music are played. Welcome music or similar audio may be played in the cabin based on preferences of the user. Similarly, the climate control of the vehicle may be enabled to prepare the climate of the cabin for passengers such as warming up or cooling the cabin to a desired temperature and/or humidity. Seats may be heated (or ventilated). A heated steering wheel may be activated. Air vents can be redirected based on preferences. The doors may be unlocked and may be opened for the passengers. In the event the destination is an electric charging station, the vehicle can be oriented so that its charger port aligns with the charger. In some embodiments, a user can configure the preferences of the vehicle, including cabin climate, interior lighting, exterior lighting, audio system, and other vehicle preferences, in anticipation of passengers.

In various embodiments, the location of the vehicle is updated during and upon summon completion. For example, the updated location may be reflected in a companion mobile application. In some embodiments, a completion action includes updating an annotated map of the traversed path and encountered environment with recently captured and analyzed sensor data. The annotated map may be updated to reflect potential obstacles, traffic signals, parking preferences, traffic patterns, pedestrian walking patterns, and/or other appropriate path planning metadata that may be useful for future navigation and/or path planning. For example, a speed bump, crosswalk, potholes, empty parking spots, charging locations, gas stations, etc. that are encountered are updated to an annotated map. In some embodiments, the data corresponding to the encounters is used as potential training data to improve summon functionality, such as the perception, path planning, safety validation, and other functionality, for the current vehicle/user as well as other vehicles and users. For example, empty parking spots may be used for the path planning of other vehicles. As another example, an electric charging station or gas station is used for path planning. The vehicle can be routed to an electric charging station and oriented so that its charger port aligns with the charger.

Figure 2:
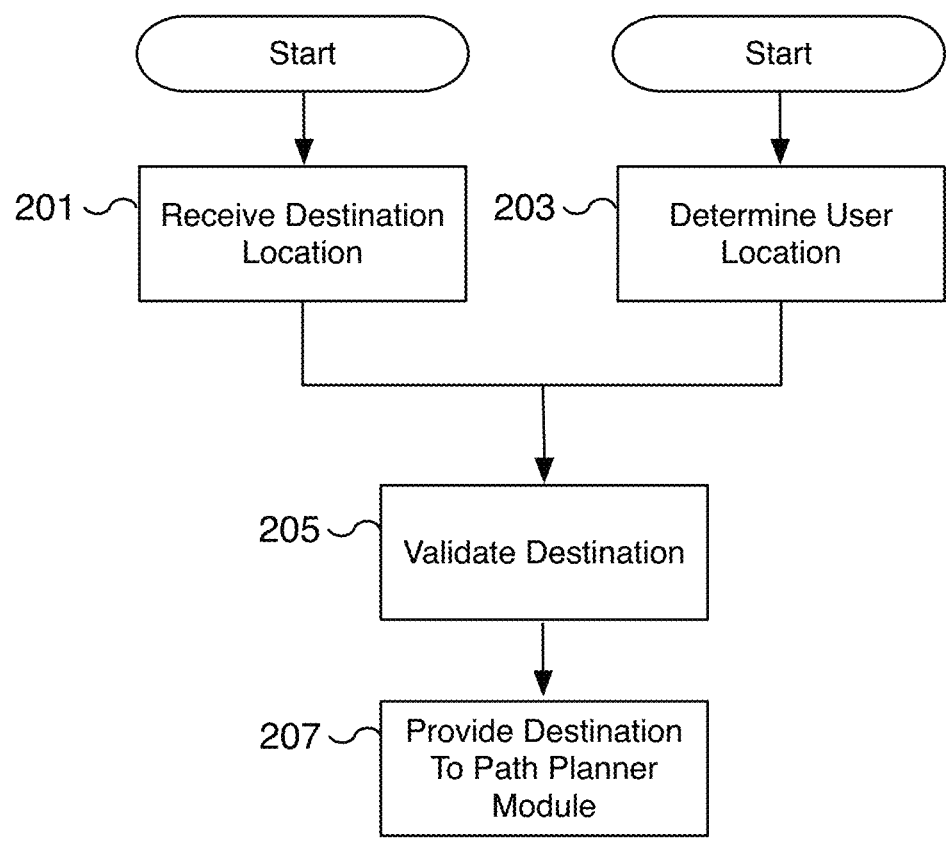
FIG. 2 is a flow diagram illustrating an embodiment of a process for receiving a target destination.

FIG. 2 is a flow diagram illustrating an embodiment of a process for receiving a target destination. In some embodiments, a target destination is selected and/or provided by a user. The destination target is associated with a geographical location and used as a goal for automatically navigating a vehicle. In the example shown, the process of receiving a target destination can be initiated from more than one start point. The two start points of FIG. 2 are two examples of initiating the receipt of a destination. Additional methods are possible as well. In some embodiments, the process of FIG. 2 is performed at 101 of FIG. 1.

At 201, a destination location is received. In some embodiments, the destination is provided as a geographical location. For example, longitude and latitude values are provided. In some embodiments, an altitude is provided as well. For example, an altitude associated with a particular floor of a parking garage is provided. In various embodiments, the destination location is provided from a user via a smartphone device, via the media console of a vehicle, or by another means. In some embodiments, the location is received along with a time associated with departing or arriving at the destination. In some embodiments, one or more destinations are received. For example, in some scenarios, a multi-step destination is received that includes more than one stop. In some embodiments, the destination location includes an orientation or heading. For example, the heading indicates the direction the vehicle should face once it has arrived at the destination.

At 203, a user location is determined. For example, the location of the user is determined using a global positioning system or another location aware technique. In some embodiments, the user's location is approximated by the location of a key fob, a smartphone device of the user, or another device in the user's control. In some embodiments, the user's location is received as a geographical location. Similar to 201, the location may be a longitude and latitude pair and in some embodiments, may include an altitude. In some embodiments, the user's location is dynamic and is continuously updated or updated at certain intervals. For example, the user can move to a new location and the location received is updated. In some embodiments, the destination location includes an orientation or heading. For example, the heading indicates the direction the vehicle should face once it has arrived at the destination.

At 205, a destination is validated. For example, the destination is validated to confirm that the destination is reachable. In some embodiments, the destination must be within a certain distance from the vehicle originating location. For example, certain regulations may require a vehicle is limited to automatically navigating no more than 50 meters. In various embodiments, an invalid destination may require the user to supply a new location. In some embodiments, an alternative destination is suggested to the user. For example, in the event a user selects the wrong orientation, a suggested orientation is provided. As another example, in the event a user selects a no-stopping area, the valid stopping area such as the closest valid stopping area is suggested. Once validated, the selected destination is provide to step 207.

At 207, the destination is provided to a path planner module. In some embodiments, a path planner module is used to determine a route for the vehicle. At 207, the validated destination is provided to the path planner module. In some embodiments, the destination is provided as one or more locations, for example, a destination with multiple stops. The destination may include a two-dimensional location, such as a latitude and longitude location. Alternatively, in some embodiments, a destination includes an altitude. For example, certain drivable areas, such as multi-level parking garages, bridges, etc., have multiple drivable planes for the same two-dimensional location. The destination may also include a heading to specify the orientation the vehicle should face when arriving at the destination. In some embodiments, the path planner module is path planner module 705 of FIG. 7.

Figure 3:
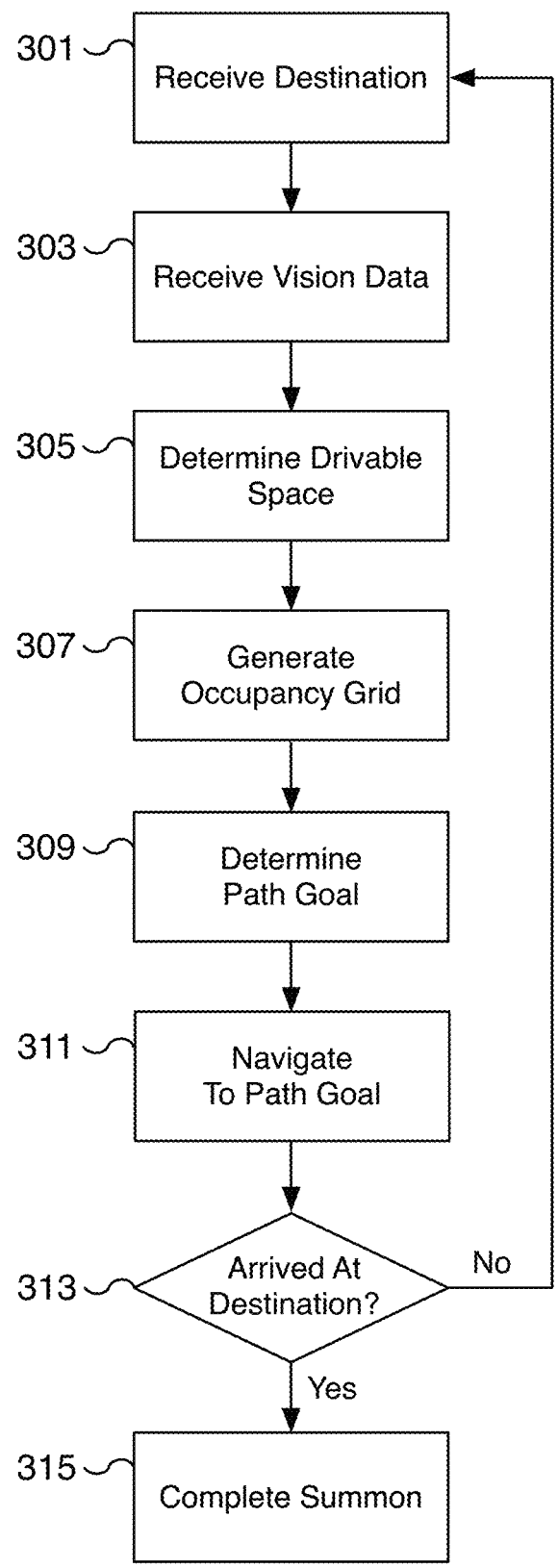
FIG. 3 is a flow diagram illustrating an embodiment of a process for automatically navigating a vehicle to a destination target.

FIG. 3 is a flow diagram illustrating an embodiment of a process for automatically navigating a vehicle to a destination target. For example, using the process of FIG. 3, a representation of an environment surrounding a vehicle is generated and used to determine one or more paths to a destination. A vehicle automatically navigates using the determined path(s). As additional sensor data is updated, the representation surrounding the environment is updated. In some embodiments, the process of FIG. 3 is performed using the autonomous vehicle system of FIG. 7. In some embodiments, the step of 301 is performed at 101 of FIG. 1, the steps of 303, 305, 307, and/or 309 are performed at 103 of FIG. 1, the steps of 311 and/or 313 are performed at 105 of FIG. 1, and/or the step of 315 is performed at 107 of FIG. 1. In some embodiments, a neural network is used to direct the path the vehicle follows. For example, using a machine learning network, steering and/or acceleration values are predicted to navigate the vehicle to follow a path to the destination target.

At 301, a destination is received. For example, a geographical location is received via a mobile app, a key fob, via a control center of the vehicle, or another appropriate device. In some embodiments, the destination is a location and an orientation. In some embodiments, the destination includes an altitude and/or a time. In various embodiments, the destination is received using the process of FIG. 2. In some embodiments, the destination is dynamic and a new destination may be received as appropriate. For example, in the event a user selects a "find me" feature, the destination is updated to follow the location of the user. Essentially the vehicle can follow the user like a pet.

At 303, vision data is received. For example, using one or more camera sensors affixed to the vehicle, camera image data is received. In some embodiments, the image data is received from sensors covering the environment surrounding the vehicle. The vision data may be preprocessed to improve the usefulness of the data for analysis. For example, one or more filters may be applied to reduce noise of the vision data. In various embodiments, the vision data is continuously captured to update the environment surrounding the vehicle.

At 305, drivable space is determined. In some embodiments, the drivable space is determined using a neural network by applying inference on the vision data received at 303. For example, a convolutional neural network (CNN) is applied using the vision data to determine drivable and non-drivable space for the environment surrounding the vehicle. Drivable space includes areas that the vehicle can travel. In various embodiments, the drivable space is free of obstacles such that the vehicle can travel using a path through the determined drivable space. In various embodiments, a machine learning model is trained to determine drivable space and deployed on the vehicle to automatically analyze and determine the drivable space from image data.

In some embodiments, the vision data is supplemented with additional data such as additional sensor data. Additional sensor data may include ultrasonic, radar, lidar, audio, or other appropriate sensor data. Additional data may also include annotated data, such as map data. For example, an annotated map may annotate vehicle lanes, speed lines, intersections, and/or other driving metadata. The additional data may be used as input to a machine learning model or consumed downstream when creating the occupancy grid to improve the results for determining drivable space.

At 307, an occupancy grid is generated. Using the drivable space determined at 305, an occupancy grid representing the environment of the vehicle is generated. In some embodiments, the occupancy grid is a two-dimensional occupancy grid representing the entire plane (e.g., 360 degrees along longitude and latitude axes) the vehicle resides in. In some embodiments, the occupancy grid includes a third dimension to account for altitude. For example, a region with multiple drivable paths at different altitudes, such as a multi-floor parking structure, an overpass, etc., can be represented by a three-dimensional occupancy grid.

In various embodiments, the occupancy grid contains drivability values at each grid location that corresponds to a location in the surrounding environment. The drivability value at each location may be a probability that the location is drivable. For example, a sidewalk may be designed to have a zero drivability value while gravel has a 0.5 drivability value. The drivability value may be a normalized probability having a range between 0 and 1 and is based on the drivable space determined at 305. In some embodiments, each location of the grid includes a cost metric associated with the cost (or penalty/reward) of traversing through that location. The cost value of each grid location in the occupancy grid is based on the drivable value. The cost value may further depend on additional data such as preference data. For example, path preferences can be configured to avoid toll roads, carpool lanes, school zones, etc. In various embodiments, the path preference data can be learned via a machine learning model and is determined at 305 as part of drivable space. In some embodiments, the path preference data is configured by the user and/or an operator to optimize the path taken for navigation to the destination received at 301. For example, the path preferences can be optimized to improve safety, convenience, travel time, and/or comfort, among other goals. In various embodiments, the preferences are additional weights used to determine the cost value of each location grid.

In some embodiments, the occupancy grid is updated with auxiliary data such as additional sensor data. For example, ultrasonic sensor data capturing nearby objects is used to update the occupancy grid. Other sensor data such as lidar, radar, audio, etc. may be used as well. In various embodiments, an annotated map may be used in part to generate the occupancy grid. For example, roads and their properties (speed limit, lanes, etc.) can be used to augment the vision data for generating the occupancy grid. As another example, occupancy data from other vehicles can be used to update the occupancy grid. For example, a neighboring vehicle with similarly equipped functionality can share sensor data and/or occupancy grid results.

In some embodiments, the occupancy data is initialized with the last generated occupancy grid. For example, the last occupancy grid is saved when a vehicle is no longer capturing new data and/or is parked or turned off. When the occupancy grid is needed, for example, when a vehicle is summoned, the last generated occupancy grid is loaded and used as an initial occupancy grid. This optimization significantly improves the accuracy of the initial grid. For example, some objects may be difficult to detect from a stand still but will have been detected in the last save occupancy grid when the vehicle was moving as it approached the current parked location.

At 309, a path goal is determined. Using the occupancy grid, a search is performed to determine a path to navigate the vehicle from its current location to the destination received at 301. The potential paths are based in part on the operating characteristics of the vehicle such as the turn radius, vehicle width, vehicle length, etc. Each vehicle model may be configured with particular vehicle operating characteristics. In some embodiments, path finding is configured to implement configurable limitations and/or goals. Example limitations include a vehicle cannot travel sideways, a vehicle should limit the number of sharp turns, the vehicle should limit the number of changes in gear (e.g., from reverse to forward or vice versa), etc. The limitations/goals may be implemented as weighted costs in a cost function. In various embodiments, the initial position of the vehicle includes an x, y, and heading value. The x and y values may correspond to longitude and latitude values. One or more potential paths are determined originating from the initial position towards reaching the goal. In some embodiments, the paths are made up of one or more path primitives, such as arc primitives. The path primitives describe a path (and a path goal) that a vehicle can navigate along to reach the destination.

In various embodiments, the selected path goal is selected based on a cost function. A cost function is performed on each of the potential paths. Each potential path traverses through a set of grids of the occupancy grid, where each grid has a cost value to reward or penalize traveling through the grid's location. The path with the optimal cost value is selected as the path goal. The path goal may include one or more path primitives, such as arcs, to model the motion of a navigating vehicle. For example, a pair of two path primitives can express moving a vehicle in reverse and then moving forward. The reverse path is represented as one arc and the forward path is represented as another arc. As another example, the vehicle path may include a three-point turn. Each primitive of the turn can be expressed as an arc path. At the end of each path primitive, the vehicle will have a new x, y, and heading value. In some embodiments, the vehicle includes an altitude value, for example, to support navigation between different floors of a parking garage. Although arc path primitives are used to define the goal path, other appropriate geometric primitives may be used as well. In some embodiments, each path includes speed parameters. For example, a speed parameter can be used to suggest travel speeds along the path. An initial speed, a max speed, an acceleration, a max acceleration, and other speed parameters can be used to control how the vehicle navigates along the path. In some embodiments, a maximum speed is set to a low speed and used to keep the vehicle from traveling too quickly. For example, a low maximum speed may be enforced to allow a user to quickly intervene.

In various embodiments, the determined path goal is passed to a vehicle controller to navigate along the path. In some embodiments, the path goal is first converted to a set of path points along the path for use by the vehicle controller. In some embodiments, the path planning is run continuously and a new path can be determined while a current path is being traversed. In some embodiments, the intended path is no longer reachable, for example, the path is blocked and a new path is determined. The path planning at 309 may be run at a lower frequency than the other functionality of the process of FIG. 3. For example, the path planning may be run at a lower frequency than drivable space is determined at 305 and/or the vehicle is controlled to navigate at 311. By determining the path goal less frequently than an occupancy grid is updated, the path planning processing is more efficient and utilizes a more accurate representation of the world.

In some embodiments, more than one route to the destination is viable and multiple path goals are provided to the user. For example, the user is shown two or more path goals as options. The user can select, for example, using a GUI, a voice command, etc., a path goal to use for navigating the vehicle to the destination. As an example, a user is shown two paths from the vehicle to the destination. The first path is estimated to take less time but has more turns and requires frequent gear changes. The second path is smoother but takes more time. The user can select a path goal from the two options. In some embodiments, the user can select a path goal and modify the route. For example, the user can adjust the route selected to navigate around a particular obstacle, such a busy intersection.

At 311, the vehicle automatically navigates to a path goal. Using the path goal or goals determined at 309, a vehicle automatically navigates from its current location along the goal path(s) to reach an arrival destination. For example, a vehicle controller receives the goal path(s) and in turn implements the vehicle controls needed to navigate the vehicle along the path. The path goal(s) may be received as a set of path points along the path to navigate. In some embodiments, the vehicle controller converts path primitives, such as arcs, to path points. In various embodiments, the vehicle is controlled by sending actuator parameters from the vehicle controller to vehicle actuators. In some embodiments, the vehicle controller is vehicle controller 707 of FIG. 7 and vehicle actuators are vehicle actuators 713 of FIG. 7. Using the vehicle actuators, the steering, braking, acceleration, and/or other operating functionality is actuated.

In some embodiments, as the vehicle navigates to the path goal, the user can adjust the navigation/operations of the vehicle. For example, the user can adjust the navigation by providing inputs such as "steer more to the left." As additional examples, the user can increase or decrease the speed of the vehicle while navigating and/or adjust the steering angle.

At 313, a determination is made whether the vehicle has arrived at the destination received at 301. In the event the vehicle has arrived at the destination, processing continues to 315. In the event the vehicle has not arrived at the destination, processing loops back to 301 to potentially receive an updated destination and automatically navigate to the (potentially updated) selected destination. In various embodiments, a vehicle has arrived at the destination but may not be at the exact location of the destination. For example, the selected destination may not be or may no longer be a drivable location. As one example, another vehicle may be parked in the selected destination. As yet another example, the user may be moved to a location, such as a passenger waiting area, which is not drivable. In certain situations, a vehicle is determined to have arrived at the destination in the event the vehicle has arrived at a location determined to be closest reachable to the destination. The closet reachable destination may be based on the path determined at 309. In some embodiments, the closet reachable destination is based on a cost function used to calculate potential paths between the current location and the destination. In some embodiments, the difference between the arrived location and the received destination is based on the accuracy of the technology available to determine location. For example, the vehicle may be parked within the accuracy of an available global positioning system.

At 315, summon is complete. In various embodiments, the summon functionality is completed and one or more completion actions are executed. For example, completion actions described with respect to 107 of FIG. 1 are performed. In some embodiments, the occupancy grid generated at 307 is saved and/or exported as a completion action. The occupancy grid may be saved local to the vehicle and/or to a remote server. Once saved, the grid can be used by the vehicle and/or shared to other vehicles with potentially overlapping paths.

Figure 4:
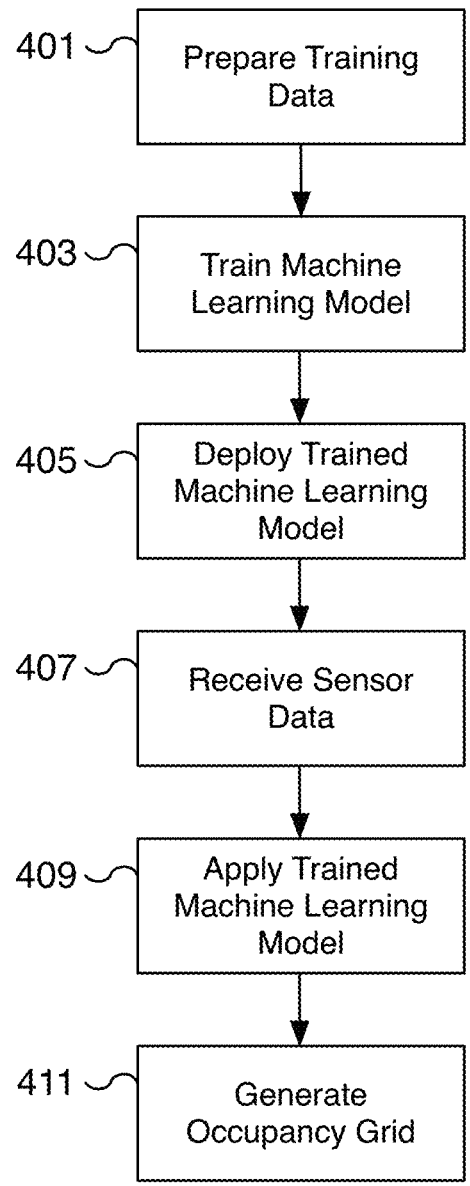
FIG. 4 is a flow diagram illustrating an embodiment of a process for training and applying a machine learning model to generate a representation of an environment surrounding a vehicle.

FIG. 4 is a flow diagram illustrating an embodiment of a process for training and applying a machine learning model to generate a representation of an environment surrounding a vehicle. In some embodiments, the process of FIG. 4 is used to determine drivable space for generating an occupancy grid using at least in part sensor data. The sensor data used for training and/or the application of the trained machine learning model may correspond to image data captured from a vehicle using camera sensors. In some embodiments, the process is used to create and deploy a machine learning model for the autonomous vehicle system of FIG. 7. In some embodiments, the process of FIG. 4 is used to determine drivable space at 305 of FIG. 3 and to generate an occupancy grid at 307 of FIG. 3.

At 401, training data is prepared. In some embodiments, sensor data including image data is utilized to create a training data set. The sensor data may include still images and/or video from one or more cameras. Additional sensors such as radar, lidar, ultrasonic, etc. may be used to provide relevant sensor data. In various embodiments, the sensor data is paired with corresponding vehicle data to help identify features of the sensor data. For example, location and change in location data can be used to identify the location of relevant features in the sensor data such as lane lines, traffic control signals, objects, etc. In some embodiments, the training data is prepared to train a machine learning model to identify drivable space. The prepared training data may include data for training, validation, and testing. In some embodiments, the format of the data is compatible with a machine learning model used on a deployed deep learning application.

At 403, a machine learning model is trained. For example, a machine learning model is trained using the data prepared at 401. In some embodiments, the model is a neural network such as a convolutional neural network (CNN). In various embodiments, the model includes multiple intermediate layers. In some embodiments, the neural network may include multiple layers including multiple convolution and pooling layers. In some embodiments, the training model is validated using a validation data set created from the received sensor data. In some embodiments, the machine learning model is trained to predict drivable space from image data. For example, drivable space of an environment surrounding a vehicle can be inferred from an image captured from a camera. In some embodiments, the image data is augmented with other sensor data such as radar or ultrasonic sensor data for improved accuracy.

At 405, the trained machine learning model is deployed. For example, the trained machine learning model is installed on a vehicle as an update for a deep learning network. In some embodiments, the deep learning network is part of a perception module such as perception module 703 of FIG. 7. The trained machine learning model may be installed as an over-the-air update. In some embodiments, the update is a firmware update transmitted using a wireless network such as a WiFi or cellular network. In some scenarios, the newly trained machine learning model is installed when the vehicle is serviced.

At 407, sensor data is received. For example, sensor data is captured from one or more sensors of the vehicle. In some embodiments, the sensors are vision sensors, such as vision sensors 701 of FIG. 7 used to capture vision data, and/or additional sensors 709 of FIG. 7. Vision sensors may include image sensors such as a camera mounted behind a windshield, forward and/or side facing cameras mounted in the pillars, rear-facing cameras, etc. In various embodiments, the sensor data is in the format or is converted into a format that the machine learning model trained at 403 utilizes as input. For example, the sensor data may be raw or processed image data. In some embodiments, the sensor data is data captured from ultrasonic sensors, radar, LiDAR sensors, microphones, or other appropriate technology. In some embodiments, the sensor data is preprocessed using an image pre-processor such as an image pre-processor during a pre-processing step. For example, the image may be normalized to remove distortion, noise, etc.

At 409, the trained machine learning model is applied. For example, the machine learning model trained at 403 is applied to sensor data received at 407. In some embodiments, the application of the model is performed by a perception module such as perception module 703 of FIG. 7 using a deep learning network. In various embodiments, by applying the trained machine learning model, drivable space is identified and/or predicted. For example, drivable space in an environment surrounding a vehicle is inferred. In various embodiments, vehicles, obstacles, lanes, traffic control signals, map features, object distances, speed limits, etc. are identified by applying the machine learning model. The detected features may be used to determine drivable space. In some embodiments, traffic control and other driving features are used to determine navigation parameters, such as speed limits, locations to stop, areas to park, orientation to face, etc. For example, stop signs, parking spaces, lane lines, and other traffic control features are detected and utilized for determining drivable space and driving parameters.

At 411, an occupancy grid is generated. For example, using the output of the trained machine learning model applied at 409, an occupancy grid is generated for path planning to determine a goal path for navigating a vehicle. The occupancy grid may be generated as described with respect to 307 of FIG. 3 and/or using the process of FIG. 5.

Figure 5:
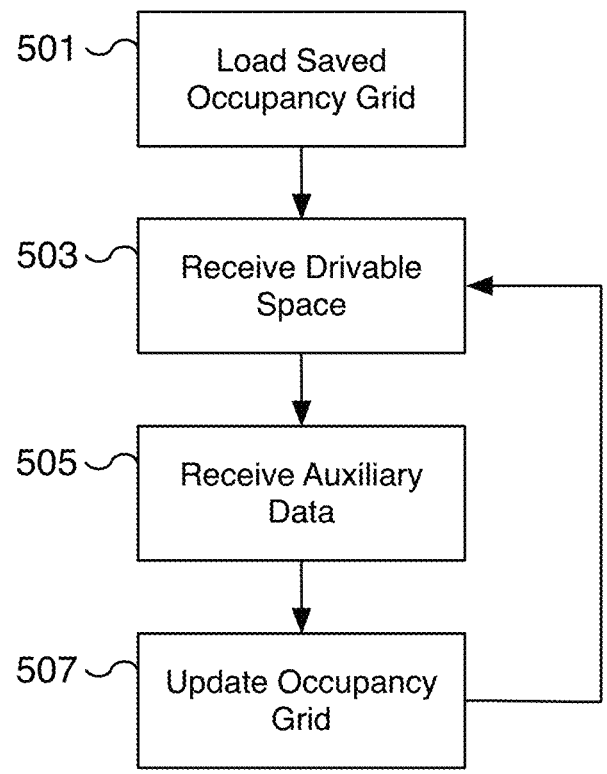
FIG. 5 is a flow diagram illustrating an embodiment of a process for generating an occupancy grid.

FIG. 5 is a flow diagram illustrating an embodiment of a process for generating an occupancy grid. For example, using the drivable space determined from sensor data, an occupancy grid can be generated for path planning. The occupancy grid can be augmented with additional sensor data, metadata from additional sources, such as annotated maps, and/or previously generated occupancy grids. In some embodiments, the process of FIG. 5 is performed at 103 of FIG. 1, 307 of FIG. 3, and/or 411 of FIG. 4. In some embodiments, the process of FIG. 5 is performed using the autonomous vehicle system of FIG. 7.

In some embodiments, the occupancy grid is generated prior to route planning. For example, the occupancy grid is generated and then presented to the user to examine, such as via a GUI on a smartphone device or via a display in the vehicle. The user can view the occupancy grid and select a target destination. The user can specify which part of the curb the user would like the vehicle to pull up to. Once selected, the vehicle can navigate to the target destination.

At 501, a saved occupancy grid is loaded. In some embodiments, a previously generated occupancy grid that corresponds to the vehicle's current location is loaded. By initializing the occupancy grid with a previously saved occupancy grid, the accuracy of the environment surrounding the vehicle can be improved. This optimization significantly improves the accuracy of the initial grid. For example, some objects may be difficult to detect from a stand still but will have been detected in the last saved occupancy grid when the vehicle was moving as it approached the current parked location.

At 503, drivable space is received. For example, drivable space is received as output from a neural network such as a convolutional neural network. In some embodiments, the drivable space is updated continuously as new sensor data is captured and analyzed. The received drivable space may be segmented into grid locations. In some embodiments, other vision-based measurements in addition to drivable space are received. For example, objects such as curbs, vehicles, pedestrians, cones, etc. are detected and received.

At 505, auxiliary data is received. For example, auxiliary data is used to update and further refine the accuracy of the occupancy grid. Auxiliary data may include data from sensors such as ultrasonic sensors or radar. Auxiliary data may also include occupancy data generated from other vehicles. For example, a mesh network of vehicles may share occupancy data based on the time and location of the occupancy data. As another example, an annotated map data may be used to augment the occupancy grid. Map data such as speed limits, lanes, drivable spaces, traffic patterns, etc. may be loaded via annotated map data.

In some embodiments, safety data used to override or modify navigation is received as auxiliary data. For example, a collision warning system inputs data at 505 used to override grid values to account for potential or pending collision. In some embodiments, auxiliary data includes data provided from the user. For example, the user may include an image or video to help identify a destination, such as a parking location and/or orientation. The received data may be used to modify the occupancy grid.

At 507, an occupancy grid is updated. Using the data received at 503 and/or 505, the occupancy grid is updated. The updated grid may include values at each grid location corresponding to a probability value of the grid location. The values may be cost values associated with navigating through the grid location. In some embodiments, values also include drivable values corresponding to the probability the grid location is a drivable area. In various embodiments, the updated occupancy grid may be saved and/or exported. For example, the grid data may be uploaded to a remote server or saved locally. As an example, when a vehicle is parked, the grid data may be saved and used to initialize the grid at a later time. As another example, the grid data may be shared with related vehicles, such as vehicles whose paths or potential paths intersect.

Once the occupancy grid is updated, processing loops back to 503 to continuously update the occupancy grid with newly received data. For example, as the vehicle navigates along a path, new drivable and/or auxiliary data is received to update the occupancy grid. The newly updated grid may be used to refine and/or update the goal path used for automatic navigation. For example, previously empty spaces may now be blocked. Similarly, previously blocked spaces may be open.

Figure 6:
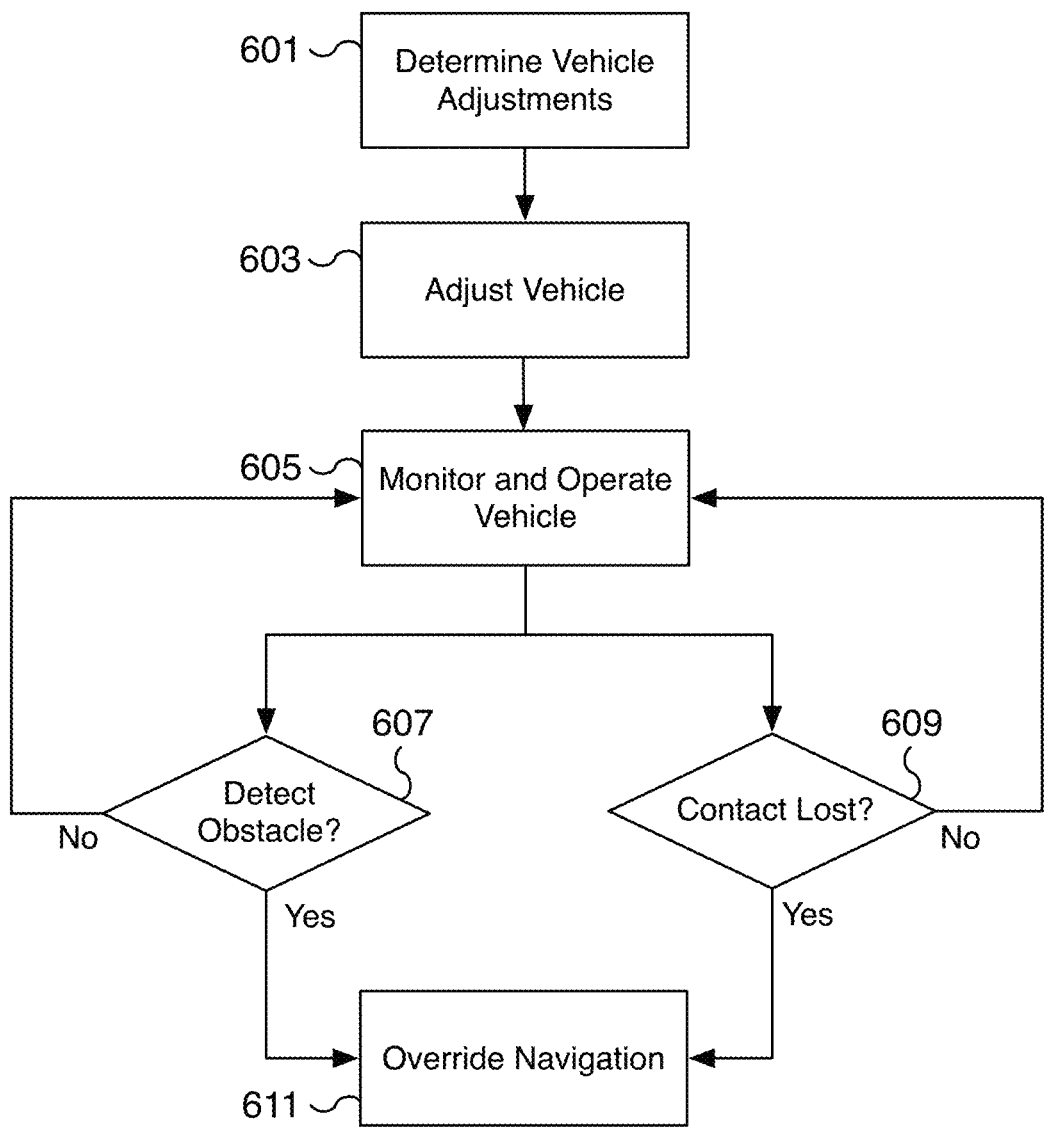
FIG. 6 is a flow diagram illustrating an embodiment of a process for automatically navigating to a destination target.

FIG. 6 is a flow diagram illustrating an embodiment of a process for automatically navigating to a destination target. The process of FIG. 6 may be used to navigate a vehicle using a determined plan goal from its current location towards a destination target location. In various embodiments, the navigation is performed automatically by a vehicle controller using vehicle actuators to modify the steering and speed of the vehicle. The process of FIG. 6 implements multiple safety checks to improve the safety of navigating the vehicle. Safety checks allow the navigation to be terminated and/or modified. For example, virtual heartbeat can be implemented that requires a user to continuously maintain contact to the vehicle to confirm the user is monitoring the vehicle's progress. In some embodiments, the navigation utilizes a path goal to navigate the vehicle along an optimal path to the destination target. The path goal may be received as path primitives, such as arcs, a set of points along the selected path, and/or another form of path primitives. In some embodiments, the process of FIG. 6 is performed at 105 of FIG. 1 and/or 311 of FIG. 3. In some embodiments, the process is performed using the autonomous vehicle system of FIG. 7.

In some embodiments, the process of FIG. 6 may be used by a user to remotely control a vehicle. For example, the user can control the steering angle, direction, and/or speed of the vehicle to remotely control the vehicle via vehicle adjustments. As the user remotely controls the vehicle, safety checks are continuously performed that can override and/or modify the user controls. For example, the vehicle can be stopped if an object is detected or contact with the remote user is lost.

At 601, vehicle adjustments are determined. For example, vehicle speed and steering adjustments are determined to maintain the vehicle on the path goal. In some embodiments, the vehicle adjustments are determined by a vehicle controller such as vehicle controller 707 of FIG. 7. In some embodiments, the vehicle controller determines the distance, speed, orientation, and/or other driving parameters for controlling the vehicle. In some embodiments, a maximum vehicle speed is determined and used to limit the speed of the vehicle. The maximum speed may be enforced to increase the safety of the navigation and/or allow the user sufficient reaction time to terminate a summon functionality.

At 603, the vehicle is adjusted to maintain its course along a path goal. For example, the vehicle adjustments determined at 601 are implemented. In some embodiments, vehicle actuators such as vehicle actuator 713 of FIG. 7 implement the vehicle adjustments. The vehicle actuators adjust the steering and/or speed of the vehicle. In various embodiments, all adjustments are logged and can be uploaded to a remote server for later review. For example, in the event of a safety concern, the vehicle actuations, path goal, destination location, current location, travel speed, and/or other driving parameters may be reviewed to identify potential areas of improvement.

At 605, the vehicle is operated according to vehicle adjustments and the operation of the vehicle is monitored. For example, the vehicle operates as directed by the vehicle adjustments applied at 603. In various embodiments, the vehicle's operation is monitored to enforce safety, comfort, performance, efficiency, and other operating parameters.

At 607, a determination is made whether an obstacle is detected. In the event an obstacle is detected, processing continues to 611. In the event an obstacle is not detected, processing continues to 605 where the vehicle's operating continues to be monitored. In some embodiments, obstacles are detected by collision or object sensors, such as an ultrasonic sensor. In some embodiments, obstacles may be communicated via a network interface. For example, obstacles detected by another vehicle may be shared and received. In various embodiments, a detected obstacle may be used to inform other components of the autonomous vehicle system, such as those related to occupancy grid generation, but is also received at a navigation component to allow the vehicle to immediately adjust for the detected obstacle.

At 609, a determination is made whether contact with the user is lost. In the event contact with the user is lost, processing continues to 611. In the event a contact with the user is not lost, processing continues to 605 where the vehicle's operating continues to be monitored. In some embodiments, constant contact with the user is required to activate automatic navigation. For example, a virtual heartbeat is sent from the user. The heartbeat may be sent from a smartphone device of the user or another appropriate device such as a key fob. In some embodiments, as long as the user activates the virtual heartbeat, the virtual heartbeat will be received and contact will not be lost. In response to the user no longer sending the virtual heartbeat, contact with the user is considered lost and the navigation of the vehicle responds appropriately at 611.

In some embodiments, the virtual heartbeat is implemented (and continuously sent to maintain contact) as long as the user makes continuous contact with a heartbeat switch, button, or other user interface device. Once the user breaks contact with the appropriate user interface element, the virtual heartbeat is no longer transmitted and contact is lost.

At 611, navigation is overridden. In response to a detected obstacle and/or contact lost with the user, automatic navigation is overridden. For example, in the event the vehicle is traveling at a slow speed, the vehicle can immediately stop. In the event the vehicle is traveling at a higher speed, the vehicle safely stops. A safe stop may require gradual braking and determining a safe stopping location, such as the side of the road or a parking spot. In various embodiments, an overridden navigation may require the user to proactively continue the automatic navigation. In some embodiments, an overridden navigation resumes once the detected obstacle is no longer present.

In some embodiments, in the event a detected obstacle overrides the navigation, the vehicle is rerouted to the destination using a new path. For example, a new path goal is determined that avoids the detected obstacle. In various embodiments, the occupancy grid is updated with the detected obstacle and the updated occupancy grid is used to determine the new path goal. Once a viable new path is determined, navigation may continue when appropriate, for example, once contact is reestablished. In some embodiments, new paths are determined when navigation is overridden. For example, when contact is lost, the path to the destination is reconfirmed. The existing path may be used if appropriate or a new path may be selected. In various embodiments, the vehicle remains stopped if no viable path can be found. For example, the vehicle is completely blocked.

Figure 7:
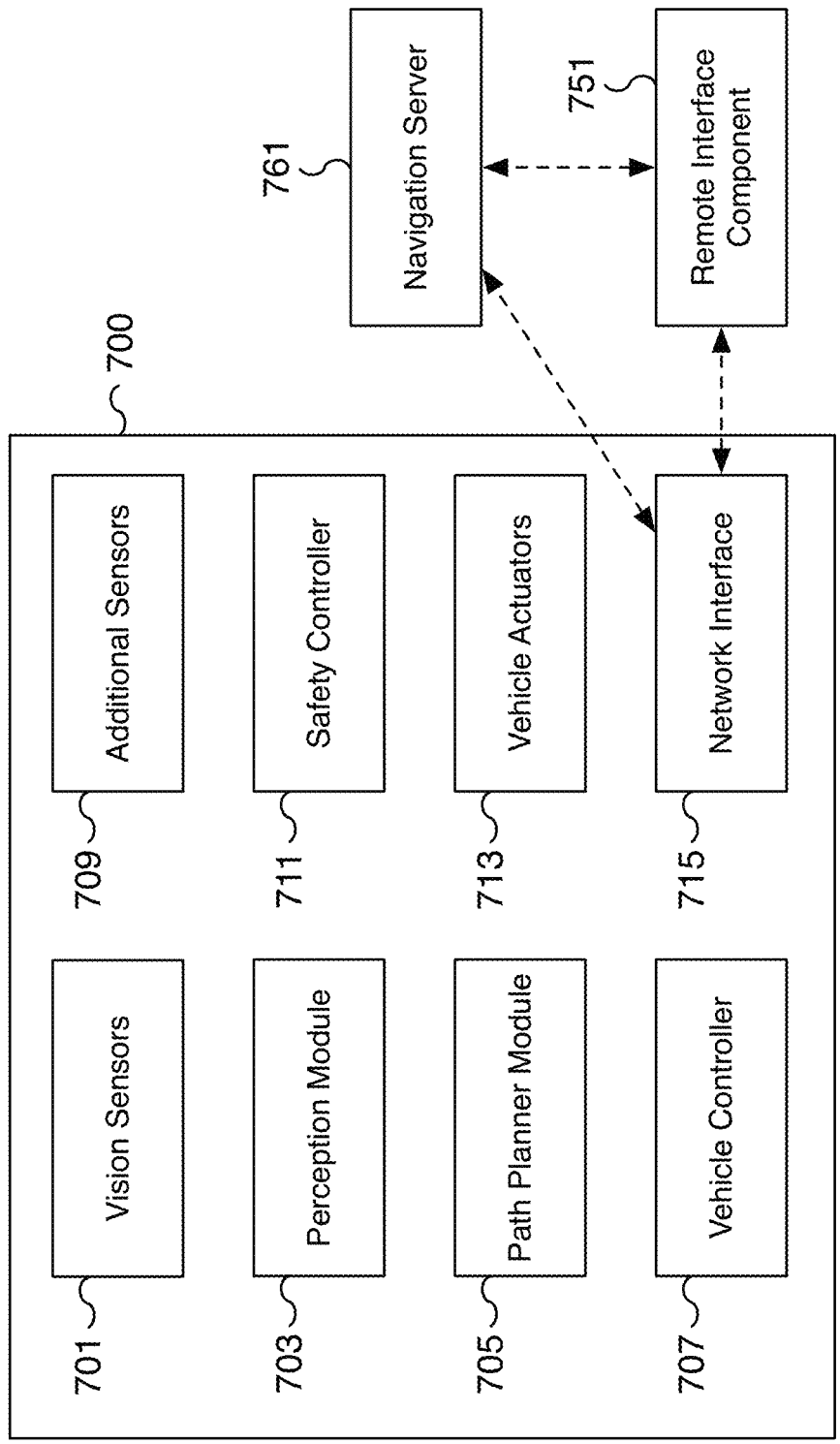
FIG. 7 is a block diagram illustrating an embodiment of an autonomous vehicle system for automatically navigating a vehicle to a destination target.

FIG. 7 is a block diagram illustrating an embodiment of an autonomous vehicle system for automatically navigating a vehicle to a destination target. The autonomous vehicle system includes different components that may be used together to navigate a vehicle automatically to a target geographical location. In the example shown, the autonomous vehicle system includes onboard components 700, remote interface component 751, and navigation server 761. Onboard components 700 are components installed on the vehicle. Remote interface component 751 is one or more remote components that may be used remotely from the vehicle to automatically navigate the vehicle. For example, remote interface component 751 includes a smartphone application running on a smartphone device, a key fob, a GUI such as a website to control the vehicle, and/or another remote interface component. Navigation server 761 is an optional server used to facilitate navigation features. Navigation server 761 is a remote server and can function as a remote cloud server and/or storage. In some embodiments, the autonomous vehicle system of FIG. 7 is used to implement the processes of FIGS. 1-6 and the functionality associated with the user interfaces of FIG. 8-9.

In the example shown, onboard components 700 is an autonomous vehicle system that includes vision sensors 701, perception module 703, path planner module 705, vehicle controller 707, additional sensors 709, safety controller 711, vehicle actuators 713, and network interface 715. In various embodiments, the different components are communicatively connected. For example, sensor data from vision sensors 701 and additional sensors 709 are fed to perception module 703. Output of perception module 703 is fed to path planner module 705. The output of path planner module 705 and sensor data from additional sensors 709 is fed to vehicle controller 707. In some embodiments, the output of vehicle controller 707 is vehicle control commands that are fed to vehicle actuators 713 for controlling the operation of the vehicle such as the speed, braking, and/or steering, etc. of the vehicle. In some embodiments, sensor data from additional sensors 709 is fed to vehicle actuators 713 to perform additional safety checks. In various embodiments, safety controller 711 is connected to one or more components such as perception module 703, vehicle controller 707, and/or vehicle actuators 713 to implement safety checks at each module. For example, safety controller 711 may receive additional sensor data from additional sensors 709 for overriding automatic navigation.

In various embodiments, sensor data, machine learning results, perception module results, path planning results, safety controller results, etc. can be sent to navigation server 761 via network interface 715. For example, sensor data can be transmitted to a navigation server 761 via network interface 715 to collect training data for improving the performance, comfort, and/or safety of the vehicle. In various embodiments, network interface 715 is used to communicate with navigation server 761, to make phone calls, to send and/or receive text messages, and to transmit sensor data based on the operation of the vehicle, among other reasons. In some embodiments, onboard components 700 may include additional or fewer components as appropriate. For example, in some embodiments, onboard components 700 include an image pre-processor (not shown) to enhance sensor data. As another example, an image pre-processor may be used to normalize an image or to transform an image. In some embodiments, noise, distortion, and/or blurriness is removed or reduced during a pre-processing step. In various embodiments, the image is adjusted or normalized to improve the result of machine learning analysis. For example, the white balance of the image is adjusted to account for different lighting operating conditions such as daylight, sunny, cloudy, dusk, sunrise, sunset, and night conditions, among others. As another example, an image captured with a fisheye lens may be warped and an image pre-processor may be used to transform the image to remove or modify the warping. In various embodiments, one or more components of onboard components may be distributed to a remote server such as navigation server 761.

In some embodiments, vision sensors 701 include one or more vision sensors. In various embodiments, vision sensors 701 may be affixed to a vehicle, at different locations of the vehicle, and/or oriented in one or more different directions. For example, vision sensors 701 may be affixed to the front, sides, rear, and/or roof, etc. of the vehicle in forward-facing, rear-facing, side-facing, etc. directions. In some embodiments, vision sensors 701 are image sensors such as high dynamic range cameras. For example, a high dynamic range forward-facing camera captures image data in front of the vehicle. In some embodiments, a vehicle is affixed with multiple sensors for capturing data. For example, in some embodiments, eight surround cameras are affixed to a vehicle and provide 360 degrees of visibility around the vehicle with a range of up to 250 meters. In some embodiments, camera sensors include a wide forward camera, a narrow forward camera, a rear view camera, forward looking side cameras, and/or rearward looking side cameras. The various camera sensors are used to capture the environment surrounding the vehicle and the captured image is provided for deep learning analysis.

In some embodiments, vision sensors 701 are not mounted to the vehicle of onboard components 700. For example, vision sensors 701 may be mounted on neighboring vehicles and/or affixed to the road or environment and are included as part of a deep learning system for capturing sensor data. In some embodiments, vision sensors 701 include one or more cameras that capture the road surface the vehicle is traveling on. For example, one or more front-facing and/or pillar cameras capture lane markings of the lane the vehicle is traveling in. Vision sensors 701 may include both image sensors capable of capturing still images and/or video. The data may be captured over a period of time, such as a sequence of captured data over a period of time.

In some embodiments, perception module 703 is used to analyze sensor data to generate a representation of the environment surrounding the vehicle. In some embodiments, perception module 703 utilizes a trained machine learning network for generating an occupancy grid. Perception module 703 may utilize a deep learning network to take as input sensor data including data from vision sensors 701 and/or additional sensors 709. The deep learning network of perception module 703 may be an artificial neural network such as a convolutional neural network (CNN) that is trained on input such as sensor data and its output is provided to path planner module 705. As one example, the output may include drivable space of the environment surrounding the vehicle. In some embodiments, perception module 703 receives as input at least sensor data. Additional input may include scene data describing the environment around the vehicle and/or vehicle specifications such as operating characteristics of the vehicle. Scene data may include scene tags describing the environment around the vehicle, such as raining, wet roads, snowing, muddy, high density traffic, highway, urban, school zone, etc. In some embodiments, perception module 703 is utilized at 103 of FIGS. 1, 305 and/or 309 of FIG. 3, 411 of FIG. 4, and/or the process of FIG. 5.

In some embodiments, path planner module 705 is a path planning component for selecting an optimal path to navigate a vehicle from one location to another. The path planning component may utilize an occupancy grid and a cost function for selecting an optimal route. In some embodiments, potential paths are made up of one or more path primitives, such as arc primitives, that model the operating characteristics of the vehicle. In some embodiments, path planner module 705 is utilized at step 103 of FIG. 1 and/or step 309 of FIG. 3. In various embodiments, path planner module 705 runs at a slower frequency or is updated less often than other components such as perception module 703 and vehicle controller 707.

In some embodiments, vehicle controller 707 is utilized to process the output of path planner module 705 and to translate a selected path into vehicle control operations or commands. In some embodiments, vehicle controller 707 is utilized to control the vehicle for automatic navigation to a selected destination target. In various embodiments, vehicle controller 707 can adjust the speed, acceleration, steering, braking, etc. of the vehicle by transmitting commends to vehicle actuators 713. For example, in some embodiments, vehicle controller 707 is used to control the vehicle to maintain the vehicle's position along a path from its current location to a selected destination.

In some embodiments, vehicle controller 707 is used to control vehicle lighting such as brake lights, turns signals, headlights, etc. In some embodiments, vehicle controller 707 is used to control vehicle audio conditions such as the vehicle's sound system, playing audio alerts, enabling a microphone, enabling the horn, etc. In some embodiments, vehicle controller 707 is used to control notification systems including warning systems to inform the driver and/or passengers of driving events such as a potential collision or the approach of an intended destination. In some embodiments, vehicle controller 707 is used to adjust sensors such as sensors 701 of a vehicle. For example, vehicle controller 707 may be used to change parameters of one or more sensors such as modifying the orientation, changing the output resolution and/or format type, increasing or decreasing the capture rate, adjusting the captured dynamic range, adjusting the focus of a camera, enabling and/or disabling a sensor, etc.

In some embodiments, additional sensors 709 include one or more sensors in addition to vision sensors 701. In various embodiments, additional sensors 709 may be affixed to a vehicle, at different locations of the vehicle, and/or oriented in one or more different directions. For example, additional sensors 709 may be affixed to the front, sides, rear, and/or roof, etc. of the vehicle in forward-facing, rear-facing, side-facing, etc. directions. In some embodiments, additional sensors 709 include radar, audio, LiDAR, inertia, odometry, location, and/or ultrasonic sensors, among others. The ultrasonic and/or radar sensors may be used to capture surrounding details. For example, twelve ultrasonic sensors may be affixed to the vehicle to detect both hard and soft objects. In some embodiments, a forward-facing radar is utilized to capture data of the surrounding environment. In various embodiments, radar sensors are able to capture surrounding detail despite heavy rain, fog, dust, and other vehicles. The various sensors are used to capture the environment surrounding the vehicle and the captured image is provided for deep learning analysis.

In some embodiments, additional sensors 709 are not mounted to the vehicle of onboard components 700. For example, additional sensors 709 may be mounted on neighboring vehicles and/or affixed to the road or environment and are included as part of an autonomous vehicle system for capturing sensor data. In some embodiments, additional sensors 709 include one or more non-vision sensors that capture the road surface the vehicle is traveling on. In some embodiments, additional sensors 709 include location sensors such as global position system (GPS) sensors for determining the vehicle's location and/or change in location.

In some embodiments, safety controller 711 is a safety component used to implement safety checks for onboard components 700. In some embodiments, safety controller 711 receives sensor input from vision sensors 701 and/or additional sensors 709. In the event an object is detected and/or a collision is highly likely, safety controller 711 can inform different components of an immediate pending safety issue. In some embodiments, safety controller 711 is capable of interrupting and/or augmenting the results of perception module 703, vehicle controller 707, and/or vehicle actuators 713. In some embodiments, safety controller 711 is used to determine how to respond to a detected safety concern. For example, at slow speeds, a vehicle can be brought to an immediate stop but at high speeds the vehicle must be safely slowed down and parked in a safe location. In various embodiments, safety controller 711 communicates with remote interface component 751 to detect whether a live connection is established between onboard components 700 and the user of remote interface component 751. For example, safety controller 711 can monitor for a virtual heartbeat from remote interface component 751 and in the event a virtual heartbeat is no longer detected, a safety alert can be triggered to terminate or modify automatic navigation. In some embodiments, the process of FIG. 6 is at least in part implemented by safety controller 711.

In some embodiments, vehicle actuator 713 is used to implement specific operating controls of the vehicle. For example, vehicle actuator 713 initiates changes in the speed and/or steering of the vehicle. In some embodiments, vehicle actuator 713 sends operating commands to a drive inverter and/or steering rack. In various embodiments, vehicle actuator 713 implements a safety check based on input from additional sensors 709 and/or safety controller 711 in the event a potential collision is detected. For example, vehicle actuator 713 brings the vehicle to an immediate stop.

In some embodiments, network interface 715 is a communication interface for sending and/or receiving data including voice data. In various embodiments, a network interface 715 includes a cellular or wireless interface for interfacing with remote servers, to connect and make voice calls, to send and/or receive text messages, to transmit sensor data, to receive updates to a perception module including updated machine learning models, to retrieve environmental conditions including weather conditions and forecasts, traffic conditions, traffic rules and regulations, etc. For example, network interface 715 may be used to receive an update for the instructions and/or operating parameters for sensors 701, perception module 703, path planner module 705, vehicle controller 707, additional sensors 709, safety controller 711, and/or vehicle actuators 713. A machine learning model of perception module 703 may be updated using network interface 715. As another example, network interface 715 may be used to update firmware of vision sensors 701 and/or operating goals of path planner module 705 such as weighted costs. As yet another example, network interface 715 may be used to transmit occupancy grid data to navigation server 761 for sharing with other vehicles.

In some embodiments, remote interface component 751 is one or more remote components that may be used remotely from the vehicle to automatically navigate the vehicle. For example, remote interface component 751 includes a smartphone application running on a smartphone device, a key fob, a GUI such as a website to control the vehicle, and/or another remote interface component. A user can initiate a summon functionality to automatically navigate a vehicle to a selected destination target specified by a geographical location. For example, a user can have a vehicle find and then follow the user. As another example, the user can specify a parking location using remote interface component 751 and the vehicle will automatically navigate to the specified location or to the closest location to the specified location that is safe to reach.

In some embodiments, navigation server 761 is an optional remote server and includes remote storage. Navigation server 761 can store occupancy grids and/or occupancy data that can be used at a later time to initialize a newly generated occupancy grid. In some embodiments, navigation server 761 is used to synchronize occupancy data across different vehicles. For example, vehicles in the area with fresh occupancy data can be initiated or updated with occupancy data generated from other vehicles. In various embodiments, navigation server 761 can communicate with onboard components 700 via network interface 715. In some embodiments, navigation server 761 can communicate with remote interface component 751. In some embodiments, one or more components or partial components of onboard components 700 are implemented on navigation server 761. For example, navigation server 761 can perform processing such as perception processing and/or path planning and provide the needed results to the onboard components 700.

Figure 8:
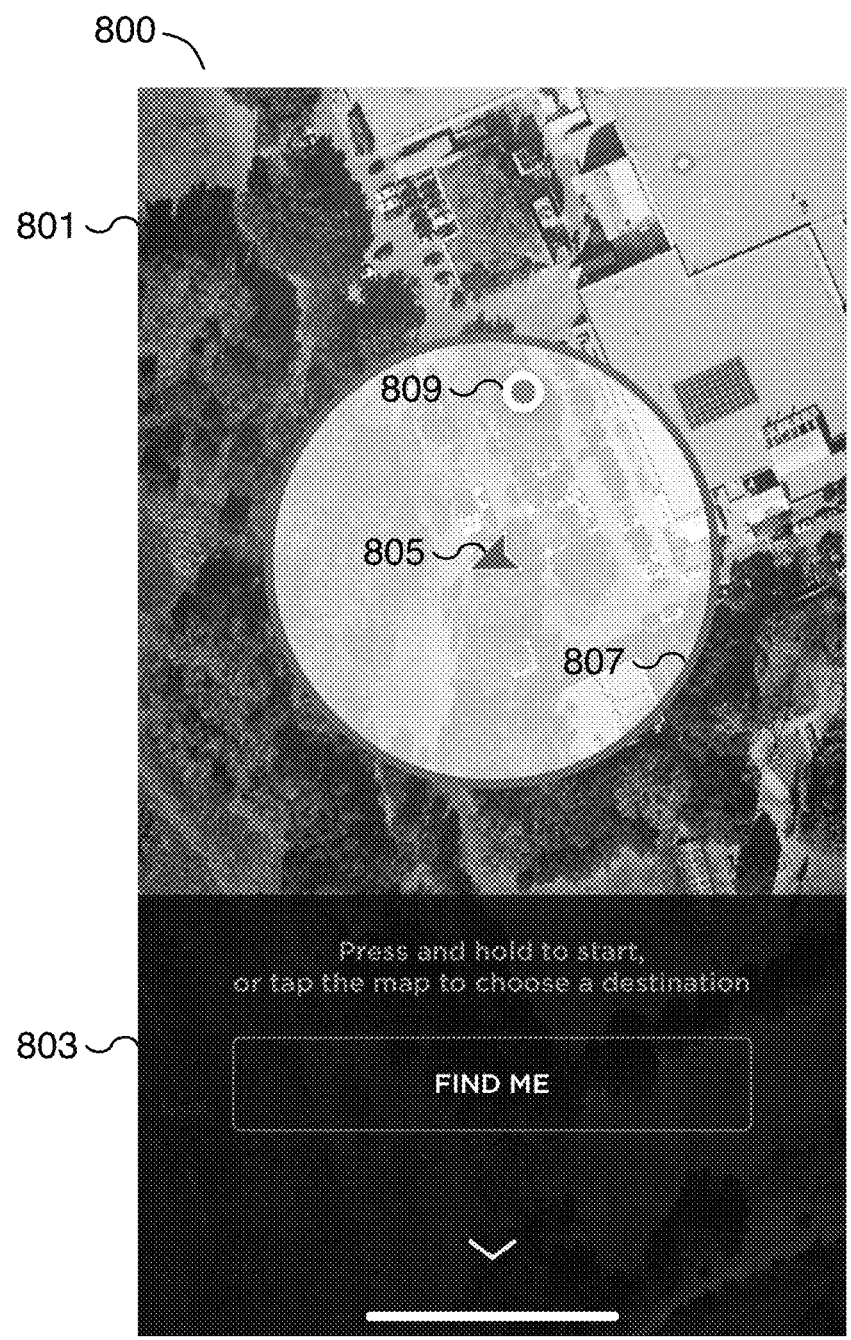
FIG. 8 is a diagram illustrating an embodiment of a user interface for automatically navigating a vehicle to a destination target.

FIG. 8 is a diagram illustrating an embodiment of a user interface for automatically navigating a vehicle to a destination target. In some embodiments, the user interface of FIG. 8 is used to initiate and/or monitor the processes of FIGS. 1-6. In some embodiments, the user interface of FIG. 8 is the user interface of a smartphone application and/or is remote interface component 751 of FIG. 7. In some embodiments, the functionality associated with FIG. 8 is initiated at 203 of FIG. 2 to navigate a vehicle to the location of a user. For example, a user interacting with the user interface on a smartphone device activates a "Find Me" action to navigate a vehicle to the location of the user's smartphone device, which accurately approximates the user's location. In the example shown, user interface 800 includes user interface components map 801, dialog window 803, vehicle locator element 805, user locator element 809, and valid summon area element 807.

In some embodiments, user interface 800 displays map 801 with the vehicle's location indicated at vehicle locator element 805 and the user's location indicated at user locator element 809. The areas that the vehicle is available to traverse when automatically navigating to the user is indicated by valid summon area element 807. In various embodiments, valid summon area element 807 is a circle that displays the maximum distance the vehicle is allowed to travel. In some embodiments, valid summon area element 807 takes into account the line of sight from the user to the vehicle and only areas with a line of sight are allowed for automatic navigation.

In the example shown, map 801 is a satellite map although alternative maps may be used. In some embodiments, map 801 may be manipulated to view different locations, for example, by panning or zooming map 801. In various embodiments, map 801 includes a three-dimensional view (not shown) to allow the user to select different altitudes, such as different levels in a parking garage. For example, areas with drivable areas at different altitudes are highlighted and can be viewed in an exploded view.

In some embodiments, vehicle locator element 805 displays both the location and orientation (or heading) of the vehicle. For example, the direction the vehicle is facing is indicated by the direction the arrow of the vehicle locator element 805 is pointing. User locator element 809 indicates the user's location. In some embodiments, the locations of other potential passengers are also displayed, for example, in another color (not shown). In some embodiments, map 801 is centered on vehicle locator element 805. In various embodiments, other data may be used as the center of map 801, such as the original (or starting) location of the vehicle, the user's current location, the closest reachable location to the user's current location, etc.

In the example shown, dialog window 803 includes a text description such as "Press and hold to start, or tap the map to choose a destination" to inform the user how to activate the summon feature. In some embodiments, the default action is to navigate the vehicle to the user. The default action is activated by selecting the "Find Me" button that is part of dialog window 803. In some embodiments, once the "Find Me" action is enabled, the selected path is displayed on the user interface (not shown in FIG. 8). As the vehicle navigates to the user's location, vehicle locator element 805 is updated to reflect the vehicle's new location. Similarly, as a user moves, user locator element 809 is updated to reflect the user's new location. In some embodiments, a trail shows the change in the user's location. In various embodiments, the user must keep contact with a virtual heartbeat button to allow the automatic navigation to continue. Once the user releases the virtual heartbeat button, the automatic navigation will stop. In some embodiments, the heartbeat button is the "Find Me" button of dialog window 803. In some embodiments, separate forward and reverse buttons function as virtual heartbeat buttons to confirm automatic navigation in forward and reverse directions, respectively (not shown).

In some embodiments, an additional "Find" functionality (not shown) can automatically navigate the vehicle to a selected person's location, for example, to pick up a passenger that is distinct from the user. In various embodiments, pre-identified locations are available to be displayed (not shown) that can be selected as destination targets. For example, locations may be pre-identified as valid parking or waiting locations for picking up passengers.

Figure 9:
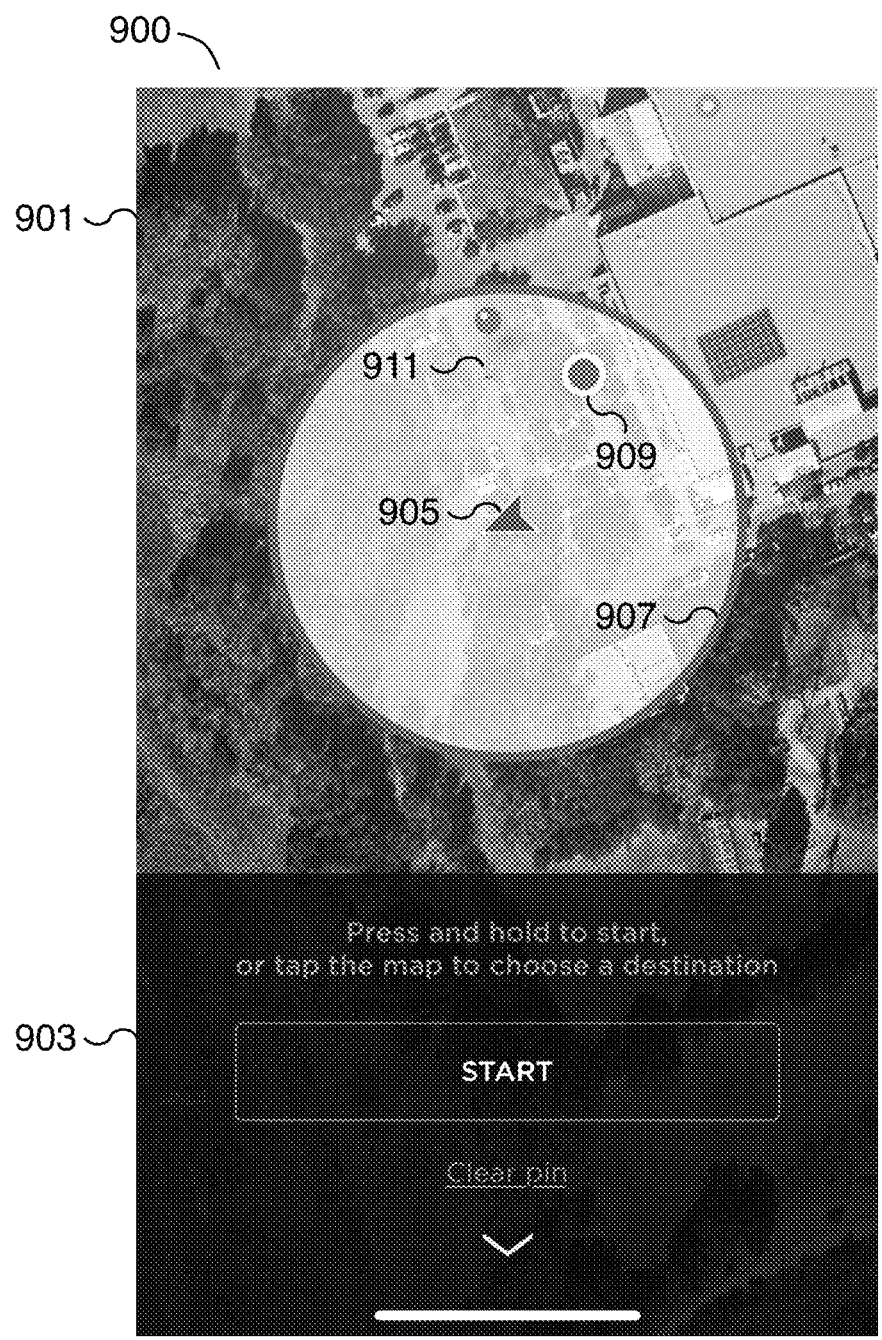
FIG. 9 is a diagram illustrating an embodiment of a user interface for automatically navigating a vehicle to a destination target.

FIG. 9 is a diagram illustrating an embodiment of a user interface for automatically navigating a vehicle to a destination target. In some embodiments, the user interface of FIG. 9 is used to initiate and/or monitor the processes of FIGS. 1-6. In some embodiments, the user interface of FIG. 9 is the user interface of a smartphone application and/or is remote interface component 751 of FIG. 7. In some embodiments, the functionality associated with FIG. 9 is initiated at 201 of FIG. 2 to navigate a vehicle to a location specified by the user. For example, a user interacting with the user interface on a smartphone device drops a pin to specify a destination target for the vehicle to navigate to. In the example shown, user interface 900 includes user interface components map 901, dialog window 903, vehicle locator element 905, user locator element 909, valid summon area element 907, and destination target element 911.

In some embodiments, user interface 900 displays map 901 with the vehicle's location indicated at vehicle locator element 905 and the user's location indicated at user locator element 909. The areas that the vehicle is available to traverse when automatically navigating to the user is indicated by valid summon area element 907. In various embodiments, valid summon area element 907 is a circle that displays the maximum distance the vehicle is allowed to travel and a user may only select a destination target within valid summon area element 907. In some embodiments, valid summon area element 907 takes into account the line of sight from the user to the vehicle and only areas with a line of sight are allowed for automatic navigation.

In the example shown, map 901 is a satellite map although alternative maps may be used. In some embodiments, map 901 may be manipulated to view different locations, for example, by panning or zooming map 901. In various embodiments, map 901 includes a three-dimensional view (not shown) to allow the user to select different altitudes, such as different levels in a parking garage. For example, areas with drivable areas at different altitudes are highlighted and can be viewed in an exploded view for selecting a destination target.

In some embodiments, vehicle locator element 905 displays both the location and orientation (or heading) of the vehicle. For example, the direction the vehicle is facing is indicated by the direction the arrow of the vehicle locator element 905 is pointing. User locator element 909 indicates the user's location. In some embodiments, the locations of other potential passengers are also displayed, for example, in another color (not shown). In some embodiments, map 901 is centered on vehicle locator element 905. In various embodiments, other data may be used as the center of map 901, such as the original (or starting) location of the vehicle, the user's current location, the closest reachable location to the user's current location, the selected destination target represented by destination target element 911, etc.

In the example shown, dialog window 903 includes a text description such as "Press and hold to start, or tap the map to choose a destination" to inform the user how to activate the summon feature. The user can select a target destination by selecting on map 901 a location within valid summon area element 907. Destination target element 911 is displayed on the valid selected location. In the example shown, a pin icon is used for destination target element 911. In some embodiments, an icon with an orientation (not shown), such as an arrow or a vehicle icon, is used as destination target element 911. The icon of destination target element 911 can be manipulated to select a final destination orientation. In various embodiments, the orientation selected is validated to confirm that the orientation is valid. For example, a destination orientation facing against traffic may not be allowed on a one-way street. To clear the selected location associated with destination target element 911, the user can select the "clear pin" dialog of dialog window 903. To initiate automatic navigation, the user selects the "Start" button of dialog window 903. In some embodiments, once the automatic navigation is enabled, the selected path is displayed on the user interface (not shown in FIG. 9). As the vehicle navigates to the destination target location, vehicle locator element 905 is updated to reflect the vehicle's new location. Similarly, as a user moves, user locator element 909 is updated to reflect the user's new location. In some embodiments, a trail shows the change in the user's location. In various embodiments, the user must keep contact with a virtual heartbeat button to allow the automatic navigation to continue. Once the user releases the virtual heartbeat button, the automatic navigation will stop. In some embodiments, the heartbeat button is the "Start" button of dialog window 903. In some embodiments, separate forward and reverse buttons function as virtual heartbeat buttons to confirm automatic navigation in forward and reverse directions, respectively (not shown).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more sensors configured to generate sensor data by capturing a real-world environment surrounding a vehicle;
a processor configured to:
receive an identification of a geographical location associated with a target specified by a user remote from the vehicle;
receive the sensor data from the one or more sensors;
utilize a machine learning model trained by training data to generate a representation of the real-world environment surrounding the vehicle, the representation of the real-world environment surrounding the vehicle generated based on a drivable space predicted by the machine learning model based on the sensor data, wherein the training data is prepared before the sensor data is generated and the drivable space is used for calculating one or more cost metrics associated with the cost of traversing through respective locations in the real-world environment surrounding the vehicle,
wherein the representation of the real-world environment surrounding the vehicle comprises an occupancy grid which includes one or more drivability values at each grid location of a plurality of grid locations which form respective portions of the occupancy grid, wherein each grid location corresponds to a location in the real-world environment,
wherein a drivability value at a grid location represents a probability that a corresponding location in the real-world environment is drivable and is selected from a range of drivability values,
and wherein the one or more cost metrics is calculated based on the drivability values;
calculate at least a portion of a path to a target location corresponding to the received geographical location using the representation of the real-world environment surrounding the vehicle; and
provide at least one command to automatically navigate the vehicle based on the path and updated sensor data from at least a portion of the one or more sensors of the vehicle,
wherein as the vehicle automatically navigates, the processor is configured to obtain new sensor data and update the drivability values included in the occupancy grid, and wherein based on the drivability values the processor is configured to adjust the path; and
a memory coupled to the processor and configured to provide the processor with instructions.

2. The system of claim 1, wherein the target specified by the user is a dynamically updated current location of a mobile device of the user.

3. The system of claim 1, wherein the geographical location is based on a global positioning system location detected by a mobile device of the user.

4. The system of claim 1, wherein the target specified by the user indicates a target orientation of the vehicle.

5. The system of claim 1, wherein the target is specified on a map by the user.

6. The system of claim 1, wherein the user selected the target within a limited geographical region within a threshold distance from a detected location of a device utilized by the user to specify the target.

7. The system of claim 1, wherein the user selected the target within a limited geographical region associated with a current location of the vehicle.

8. The system of claim 1, wherein an ability for the user to specify the target is enabled based on a determination that a location of a device of the user is within a threshold distance from a current location of the vehicle.

9. The system of claim 1, wherein the automatic navigation of the vehicle is aborted in response to a determination that a heartbeat signal has not been received from a device of the user, wherein the heartbeat signal is provided based on the user providing user input to an application executing on the device.

10. The system of claim 1, wherein the automatic navigation of the vehicle is paused in response to a detection of an obstacle using an ultrasonic sensor.

11. The system of claim 1, wherein a speed of the vehicle during the automatic navigation is limited to be equal or less than a specified limit.

12. The system of claim 1, wherein the target location is dynamically updated based on a periodically updated geographical location of a device of the user.

13. The system of claim 1, wherein the one or more sensors of the vehicle include a plurality of cameras.

14. The system of claim 1, wherein the representation of the at least portion of the real-world environment is generated using auxiliary sensor data obtained using one or more of the following: an ultrasonic sensor or a radar sensor.

15. The system of claim 1, wherein the processor is further configured to receive a specified target time associated with the target specified by the user.

16. The system of claim 1, wherein the representation of the at least portion of the real-world environment surrounding the vehicle includes a three-dimensional representation of the real-world environment.

17. The system of claim 1, wherein the target location is determined including by determining whether the geographical location of the specified target is a valid location to be occupied by the vehicle.

18. The system of claim 1, wherein the target location is determined based on the sensor data from the one or more sensors.

19. The system of claim 1, wherein the occupancy grid includes a plurality of cost metrics associated with cost of traversing through the plurality of grid locations.

20. The system of claim 1, wherein to calculate at least a portion of a path to a target location, the processor is configured to calculate a plurality of potential paths to the target location, wherein each potential path is calculated according to the cost metrics calculated based on drivability values included in grid locations of the potential path, and wherein the path is selected based, at least in part, on the cost metrics calculated for the potential paths.

21. The system of claim 1, wherein at least one drivability value is indicative of a surface type.

22. A method implemented by one or more processors, the method comprising:
using one or more sensors to generate sensor data by capturing a real-world environment surrounding a vehicle;
receiving an identification of a geographical location associated with a target specified by a user remote from the vehicle;
utilizing a trained machine learning model to generate a representation of the real-world environment surrounding the vehicle, the representation of the real-world environment surrounding the vehicle being generated based on a drivable space predicted by the trained machine learning model based on the sensor data, wherein the drivable space is used for calculating one or more cost metrics associated with the cost of traversing through respective locations in the real-world environment surrounding the vehicle,
wherein the representation of the real-world environment surrounding the vehicle comprises an occupancy grid which includes one or more drivability values at each grid location of a plurality of grid locations which form respective portions of the occupancy grid, wherein each grid location corresponds to a location in the real-world environment,
wherein a drivability value at a grid location represents a probability that a corresponding location in the real-world environment is drivable and is selected from a range of drivability values,
and wherein the one or more cost metrics is calculated based on the drivability values;
calculating at least a portion of a path to a target location corresponding to the received geographical location using the representation of the real-world environment surrounding the vehicle; and
providing at least one command to automatically navigate the vehicle based on the path and updated sensor data from at least a portion of the one or more sensors of the vehicle,
wherein as the vehicle automatically navigates, new sensor data is obtained and the drivability values are updated based on the new sensor data, and wherein based on the updated drivability values the processor is configured to adjust the path.

23. The method of claim 22, wherein calculating at least a portion of a path to a target location comprises calculating a plurality of potential paths to the target location, wherein each potential path is calculated according to the cost metrics calculated based on drivability values included in grid locations of the potential path, and wherein the path is selected based, at least in part, on the cost metrics calculated for the potential paths.

24. A computer program product, the computer program product being embodied in a non-transitory computer readable storage medium and comprising computer instructions which when expected by one or more processors, cause the one or more processors to perform operations comprising:

receiving an identification of a geographical location associated with a target specified by a user remote from a vehicle;

utilizing a neural network as part of a trained machine learning model to generate a representation of a real-world environment surrounding the vehicle, the representation of the real-world environment surrounding the vehicle generated based on a drivable space predicted by the trained machine learning model based on sensor data generated by one or more sensors, wherein the drivable space is used for calculating one or more cost metrics associated with the cost of traversing through respective locations in the real-world environment surrounding the vehicle, wherein the representation of the real-world environment surrounding the vehicle comprises an occupancy grid which includes one or more drivability values at each grid location of a plurality of grid locations which form respective portions of the occupancy grid, wherein each grid location corresponds to a location in the real-world environment, wherein a drivability value at a grid location represents a probability that a corresponding location in the real-world environment is drivable and is selected from a range of drivability values, and wherein the one or more cost metrics is calculated based on the drivability values;

calculating at least a portion of a path to a target location corresponding to the received geographical location using the representation of the real-world environment surrounding the vehicle; and providing at least one command to automatically navigate the vehicle based on the path and updated sensor data from at least a portion of the one or more sensors of the vehicle, wherein as the vehicle automatically navigates, the one or more processors is configured to obtain new sensor data and update the drivability values included in the occupancy grid, and wherein based on the drivability values the one or more processors is configured to adjust the path.

25. The computer program product of claim 24, wherein calculating at least a portion of a path to a target location comprises calculating a plurality of potential paths to the target location, wherein each potential path is calculated according to the cost metrics calculated based on drivability values included in grid locations of the potential path, and wherein the path is selected based, at least in part, on the cost metrics calculated for the potential paths.

* * * * *